(12) United States Patent
Liao et al.

(10) Patent No.: US 11,467,633 B2
(45) Date of Patent: Oct. 11, 2022

(54) HINGE AND MOBILE TERMINAL

(71) Applicant: HUAWEI TECHNOLOGIES CO., LTD., Guangdong (CN)

(72) Inventors: Changliang Liao, Dongguan (CN); Weifeng Wu, Shenzhen (CN); Li Liao, Dongguan (CN); Kenji Nagai, Yokohama (JP); Ding Zhong, Dongguan (CN); Qiao Deng, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 108 days.

(21) Appl. No.: 17/118,992

(22) Filed: Dec. 11, 2020

(65) Prior Publication Data

US 2021/0181808 A1  Jun. 17, 2021

(30) Foreign Application Priority Data

Dec. 13, 2019  (CN) .......................... 201911286336.8

(51) Int. Cl.
| | |
|---|---|
| *G06F 1/16* | (2006.01) |
| *F16C 11/04* | (2006.01) |
| *H04M 1/02* | (2006.01) |
| *E05D 3/12* | (2006.01) |

(52) U.S. Cl.
CPC ............ *G06F 1/1681* (2013.01); *F16C 11/04* (2013.01); *G06F 1/1616* (2013.01); *G06F 1/1652* (2013.01); *E05D 3/122* (2013.01); *E05Y 2201/604* (2013.01); *E05Y 2900/606* (2013.01); *H04M 1/0268* (2013.01)

(58) Field of Classification Search
CPC combination set(s) only.
See application file for complete search history.

(56) References Cited

U.S. PATENT DOCUMENTS

| | | | |
|---|---|---|---|
| 9,572,272 B2 | 2/2017 | Lee | |
| 9,696,763 B2 | 7/2017 | Mok et al. | |
| 10,664,021 B1 * | 5/2020 | Hsu | ........................ G06F 1/1681 |
| (Continued) | | | |

FOREIGN PATENT DOCUMENTS

| | | |
|---|---|---|
| CN | 1681380 A | 10/2005 |
| CN | 102597904 A | 7/2012 |
| (Continued) | | |

*Primary Examiner* — Lisa Lea-Edmonds
(74) *Attorney, Agent, or Firm* — Womble Bond Dickinson (US) LLP

(57) ABSTRACT

A hinge and a mobile terminal to resolve poor use effect of a foldable electronic device. The hinge includes a main body, and a first folding assembly and a second folding assembly that are symmetrically disposed along the main body. When the first folding assembly and the second folding assembly are rotated toward each other, a length of the hinge can be extended, and an accommodation space for accommodating the flexible display can be formed. When the first folding assembly and the second folding assembly are rotated away from each other, the length of the hinge can be reduced, and a support surface for supporting the flexible display can be formed, so that the flexible display cannot be stretched, compressed, or the like during folding and unfolding, thereby improving the use effect and safety of the mobile terminal.

30 Claims, 10 Drawing Sheets

(56) References Cited

U.S. PATENT DOCUMENTS

| | | | |
|---|---|---|---|
| 11,231,754 B2* | 1/2022 | Kang | G06F 1/1616 |
| 11,336,759 B2* | 5/2022 | Liao | G06F 1/1641 |
| 2017/0142240 A1 | 5/2017 | Xu | |
| 2019/0268456 A1 | 8/2019 | Park et al. | |
| 2020/0348732 A1* | 11/2020 | Kang | H04M 1/0268 |
| 2021/0355988 A1* | 11/2021 | Cheng | H04M 1/022 |
| 2022/0051594 A1* | 2/2022 | Eguchi | G06F 1/1647 |
| 2022/0116489 A1* | 4/2022 | Nagai | F16C 11/04 |
| 2022/0137676 A1* | 5/2022 | Tian | G09F 9/301 |
| | | | 361/679.27 |
| 2022/0155828 A1* | 5/2022 | Hsiang | H04M 1/0216 |
| 2022/0164002 A1* | 5/2022 | An | G06F 1/1616 |
| 2022/0166456 A1* | 5/2022 | Dannenberg | H04M 1/0268 |

FOREIGN PATENT DOCUMENTS

| | | |
|---|---|---|
| CN | 103167071 A | 6/2013 |
| CN | 105407187 A | 3/2016 |
| CN | 105491193 A | 4/2016 |
| CN | 205978043 U | 2/2017 |
| CN | 206100081 U | 4/2017 |
| CN | 107135288 A | 9/2017 |
| CN | 108076171 A | 5/2018 |
| CN | 207977992 U | 10/2018 |
| CN | 108769317 A | 11/2018 |
| CN | 108874048 A | 11/2018 |
| CN | 109257460 A | 1/2019 |
| CN | 208421694 U | 1/2019 |
| CN | 109495621 A | 3/2019 |
| CN | 109600466 A | 4/2019 |
| CN | 109979328 A | 7/2019 |
| CN | 110007715 A | 7/2019 |
| CN | 110010008 A | 7/2019 |
| CN | 110035140 A | 7/2019 |
| CN | 110213417 A | 9/2019 |
| CN | 110273915 A | 9/2019 |
| CN | 209430596 U | 9/2019 |
| CN | 209472651 U | 10/2019 |
| CN | 110552953 A | 12/2019 |
| CN | 209724948 U | 12/2019 |
| CN | 209731301 U | 12/2019 |
| CN | 209882285 U | 12/2019 |
| CN | 110671423 A | 1/2020 |
| CN | 110985524 A | 4/2020 |
| CN | 110992833 A | 4/2020 |
| CN | 111327739 A | 6/2020 |
| CN | 210799707 U | 6/2020 |
| CN | 111615277 A | 9/2020 |
| KR | 101487189 B1 | 1/2015 |
| KR | 20180094172 A | 8/2018 |
| KR | 20180138494 A | 12/2018 |
| KR | 20190065641 A | 6/2019 |
| KR | 20190097898 A | 8/2019 |
| KR | 20190110244 A | 9/2019 |
| KR | 102152040 B1 | 9/2020 |
| WO | 2017211115 A1 | 12/2017 |
| WO | 2018082338 A1 | 5/2018 |
| WO | 2019085891 A1 | 5/2019 |
| WO | 2019225930 A1 | 11/2019 |
| WO | 2020057032 A1 | 3/2020 |

\* cited by examiner

HINGE AND MOBILE TERMINAL

CROSS-REFERENCE TO RELATED DISCLOSURES

This application claims priority to Chinese Patent Application No. 201911286336.8, filed on Dec. 13, 2019, which is hereby incorporated by reference in its entirety.

TECHNICAL FIELD

This disclosure relates to the technical field of electronic devices, and in particular, to a hinge and a mobile terminal.

BACKGROUND

Currently, a foldable display is widely used in mobile terminals, and the foldable display is mainly implemented by a combination of a flexible display (for example, an Organic Light-emitting Diode (OLED)_display) and a hinge. Because the flexible display is a relatively fragile component, the flexible display cannot withstand a heavy pressure or tension during folding. As shown in FIG. 1 and FIG. 2, a mobile terminal 01 of an inner folding type is used as an example. During folding, because a rotation radius of a flexible display 011 is less than a rotation radius of a hinge 012, if a length of the hinge 012 does not change (for example, the hinge 012 is not extended), the flexible display 011 may be compressed too much during folding, and the flexible display 011 may be damaged.

As shown in FIG. 3, to prevent the flexible display 011 from being squeezed during folding, the flexible display 011 is slidably disposed on a housing 013 by some manufacturers, so that the flexible display 011 can be prevented from being compressed through sliding relative to the housing 013. However, when the mobile terminal 01 is unfolded, a hollow area 014 is formed between an edge of the flexible display 011 and the housing 013, which reduces a screen-to-body ratio of the flexible display 011. In addition, the hollow area 014 easily accumulates impurities such as dust, and in some cases, the impurities in the hollow area 014 also hinder relative sliding between the flexible display 011 and the housing 013, which affects normal use of the mobile terminal 01.

In addition, when some mobile terminals are folded, a hinge portion may bulge outward as a whole, so that a side surface of the mobile terminal has a hollow baseball-like structure. Therefore, an overall thickness of the mobile terminal is increased, which is disadvantageous for improving portability. In addition, foreign matters are easily accumulated in a bulged baseball-shaped space, which increases risk of damage to the flexible display.

In some mobile terminals, the hinge uses a single shaft; that is, the two relatively folded portions in the mobile terminal are hinged by a rotation shaft. However, when the two portions are relatively folded, no sufficient deformation space can be provided for the flexible display, and consequently, the flexible display is creased or even damaged; and the hinge may generate a large gap after being folded, which affects integrity and closeness of the mobile terminal.

SUMMARY

This disclosure provides a hinge and a mobile terminal, where the hinge does not compress a flexible display during folding, so that a sufficient accommodation space is provided for the flexible display, a thickness of the mobile terminal does not increase after being folded, and no large gap is formed.

An embodiment of this disclosure provides a hinge, including a main body, and a first folding assembly and a second folding assembly that are symmetrically disposed along the main body, where the first folding assembly and the second folding assembly are rotatable relative to the main body toward or away from each other, so as to implement a folding function of the hinge. The first folding assembly may include a first swing link, a first swing arm, a first driven arm, and a first support plate. One end of the first swing arm is rotatably connected to the main body, and the other end is rotatably connected to the first swing link. One end of the first driven arm is rotatably connected to the main body, and the other end is slidably connected to the first swing link. Rotation axes of the first driven arm and the first swing arm on the main body are parallel to each other and do not coincide, so that a length of the first folding assembly changes when the first folding assembly is rotated relative to the main body. The second folding assembly may include a second swing link, a second swing arm, a second driven arm, and a second support plate. One end of the second swing arm is rotatably connected to the main body, and the other end is rotatably connected to the second swing link. One end of the second driven arm is rotatably connected to the main body, and the other end is slidably connected to the second swing link. Rotation axes of the second driven arm and the second swing arm on the main body are parallel to each other and do not coincide, so that a length of the second folding assembly changes when the second folding assembly is rotated relative to the main body.

When the hinge is folded, the first swing link and the second swing link rotate toward each other, the first swing link drives the first driven arm to synchronously rotate, the first swing link and the first swing arm extend relative to the first driven arm, the second swing link drives the second driven arm to synchronously rotate, and the second swing link and the second swing arm extend relative to the second driven arm to increase a length of the hinge; the first swing arm or first driven arm that is slidably connected to the first support plate drives the first support plate to rotate forward relative to the first swing link (for example, when the first swing link rotates clockwise, the first support plate rotates clockwise relative to the first swing link), and the second swing arm or second driven arm slidably that is connected to the second support plate drives the second support plate to rotate forward relative to the second swing link (for example, when the second swing link rotates counterclockwise, the second support plate rotates counterclockwise relative to the second swing link) so that the first support plate, the second support plate, and the main body enclose to form an accommodation space.

When the hinge is unfolded, the first swing link and the second swing link rotate away from each other, the first swing link drives the first driven arm to synchronously rotate, the first swing link and the first swing arm contract relative to the first driven arm, the second swing link drives the second driven arm to synchronously rotate, and the second swing link and the second swing arm contract relative to the second driven arm to reduce the length of the hinge. The first swing arm or first driven arm that is slidably connected to the first support plate drives the first support plate to rotate forward relative to the first swing link (for example, when the first swing link rotates counterclockwise, the first support plate rotates counterclockwise relative to the first swing link), and the second swing arm or second driven arm that is slidably connected to the second support plate drives the second support plate to rotate forward relative to the second swing link (for example, when the second swing link rotates clockwise, the second support plate rotates clockwise relative to the second swing link) to flatten the first support plate, the second support plate, and the main body to form a support surface, so that a good supporting function can be provided for the flexible display.

According to the hinge provided in an embodiment of this disclosure, when the hinge is folded, the length of the hinge can be well extended, and the first support plate, the main body, and the second support plate can gradually enclose to form an accommodation space; and when the hinge is unfolded, the length of the hinge can be well reduced, and the first support plate, the main body, and the second support plate can be gradually flattened to form a support surface. In addition, in this process, there is no obvious gap in the hinge from the appearance, so that the hinge has a better shielding effect, and integrity and safety of the hinge can be improved.

In an embodiment, to implement a rotational connection between the main body and the first swing arm, the main body may include an outer housing and an inner housing, an arc recess may be disposed in the outer housing, and an arc projection may be disposed in the inner housing. After the outer housing and the inner housing are snap-fit and fastened, the arc recess and the arc protrusion are snap-fit to form a first arc groove; that is, an arc gap is formed between the arc recess and the arc protrusion. A first arc shaft is disposed at one end of the first swing arm, and the rotational connection between the first swing arm and the main body may be implemented by fitting the first arc shaft in the first arc groove. Through the virtual shaft connection, a connection structure between the first swing arm and the main body can be well concealed in the main body, thereby improving integrity and use experience of the hinge.

To implement the rotational connection between the main body and the second swing arm, the foregoing structure for implementing the rotational connection between the main body and the first swing arm may be used. For example, the main body may include an outer housing and an inner housing that can be mutually snap-fit, an arc recess may be disposed in the outer housing, and an arc projection may be disposed in the inner housing. After the outer housing and the inner housing are snap-fit and fastened, the arc recess and the arc protrusion are snap-fit to form a second arc groove; that is, an arc gap is formed between the arc recess and the arc protrusion. A second arc shaft is disposed at one end of the second swing arm, and a rotational connection between the second swing arm and the main body may be implemented by fitting the second arc shaft in the second arc groove. Through the virtual shaft connection, a connection structure between the second swing arm and the main body can be well concealed in the main body, thereby improving integrity and use experience of the hinge.

In an embodiment, to implement a rotational connection between the first swing link and the first swing arm, a first shaft hole may be disposed at one end of the first swing arm, and a second shaft hole may be disposed at one end of the first swing link; and a pin shaft is threaded through the first shaft hole and the second shaft hole, so as to implement the rotational connection between the first swing arm and the first swing link.

Further, to implement a rotational connection between the second swing link and the second swing arm, a third shaft hole may be disposed at one end of the second swing arm, and a fourth shaft hole may be disposed at one end of the second swing link; and a pin shaft is threaded through the third shaft hole and the fourth shaft hole, so as to implement the rotational connection between the second swing arm and the second swing link.

In an embodiment, the main body and the first swing arm may be rotatably connected using a pin shaft, or may be rotatably connected in another structural form; and the main body and the second swing arm may be rotatably connected using a pin shaft, or may be rotatably connected in another structural form. This is not specifically limited in this disclosure. In addition, the first swing link and the first swing arm may be rotatably connected using a virtual shaft (for example, through cooperation between an arc groove and an arc shaft), and the second swing link and the second swing arm may also be rotatably connected using a virtual shaft (for example, through cooperation between an arc groove and an arc shaft). This is not specifically limited in this disclosure.

In addition, in an embodiment, the first driven arm and the main body are rotatably connected using a virtual shaft (for example, through cooperation between the arc groove and the arc shaft) as described above, or may be rotatably connected using a pin shaft or in another manner as described above. To implement the rotational connection between the second driven arm and the main body, the second driven arm and the main body may be rotatably connected using a virtual shaft (for example, through cooperation between the arc groove and the arc shaft) as described above, or may be rotatably connected using a pin shaft or in another manner as described above. Details are not described herein.

In an embodiment, a first sliding groove may be disposed in the first swing link, a first sliding rail may be disposed on the first driven arm, and the first sliding rail may be slidably disposed in the first sliding groove, so as to implement the sliding connection between the first driven arm and the first swing link. In an embodiment, the first sliding groove may alternatively be disposed on the first driven arm, and the first sliding rail may alternatively be disposed on the first swing link. In addition, the first sliding groove and the first sliding rail may be in various shapes. For example, cross sections of the first sliding groove and the first sliding rail are cross-shaped; or the cross sections of the first sliding groove and the first sliding rail may be trapezoidal, triangular, or the like. Details are not described in this disclosure.

In addition, a second sliding groove may be disposed in the second swing link, a second sliding rail may be disposed on the second driven arm, and the second sliding rail may be slidably disposed in the second sliding groove, so as to implement the sliding connection between the second driven arm and the second swing link. In an embodiment, the second sliding groove may alternatively be disposed on the second driven arm, and the second sliding rail may alternatively be disposed on the second swing link. In addition, the second sliding groove and the second sliding rail may be in various shapes. For example, cross sections of the second sliding groove and the second sliding rail are cross-shaped; or the cross sections of the second sliding groove and the second sliding rail may be trapezoidal, triangular, or the like. Details are not described in this disclosure.

In an embodiment, the first support plate and the first swing link may be rotatably connected using a virtual shaft as described above, or may be rotatably connected using a pin shaft, or may be rotatably connected in another manner. For example, the first swing link and the first support plate may be rotatably connected using a virtual shaft. For example, a third arc groove may be disposed on the first swing link, a third arc shaft matching the third arc groove may be disposed on the first support plate, and the third arc shaft is disposed in the third arc groove, so as to implement a rotational connection between the first support plate and the first swing link. Through the virtual shaft connection, the third arc groove and the third arc shaft can be well concealed, so that the third arc groove and the third arc shaft are not exposed, and visual integrity of the hinge can be improved.

Further, the second support plate and the second swing link may be rotatably connected using a virtual shaft as described above, or may be rotatably connected using a pin shaft, or may be rotatably connected in another manner. For example, the second swing link and the second support plate may be rotatably connected using a virtual shaft. For example, a fourth arc groove may be disposed on the second swing link, a fourth arc shaft matching the fourth arc groove may be disposed on the second support plate, and the fourth arc shaft is disposed in the fourth arc groove, so as to implement a rotational connection between the second support plate and the second swing link. Through the virtual shaft connection, the fourth arc groove and the fourth arc shaft can be well concealed, so that the fourth arc groove and the fourth arc shaft are not exposed, and visual integrity of the hinge can be improved.

In an embodiment, to enable the first support plate to rotate relative to the first swing link during folding of the hinge, the first support plate can be slidably connected to the first driven arm, so that the first driven arm can drive the first support plate to rotate relative to the first swing link. For example, a third sliding groove may be disposed on the first support plate, a first positioning shaft may be disposed on the first driven arm, and the first positioning shaft is slidably disposed in the third sliding groove. When a relative sliding movement occurs between the first driven arm and the first swing link, the first positioning shaft pushes against a side wall of the third sliding groove to rotate the first support plate around the first swing link. In an embodiment, the third sliding groove may be an arc groove, a rectilinear groove, an irregular curvilinear groove, or the like. In actual disclosure, a shape of the third sliding groove can be adjusted based on a target movement track of the first support plate.

In addition, in an embodiment, to enable the second support plate to rotate relative to the second swing link during folding of the hinge, the second support plate can be slidably connected to the second driven arm, so that the second driven arm can drive the second support plate to rotate relative to the second swing link. For example, a fourth sliding groove may be disposed on the second support plate, a second positioning shaft may be disposed on the second driven arm, and the second positioning shaft is slidably disposed in the fourth sliding groove. When a relative sliding movement occurs between the second driven arm and the second swing link, the second positioning shaft pushes against a side wall of the fourth sliding groove to rotate the second support plate around the second swing link. In an embodiment, the fourth sliding groove may be an arc groove, a rectilinear groove, an irregular curvilinear groove, or the like. In actual disclosure, a shape of the fourth sliding groove can be adjusted based on a target movement track of the second support plate.

In an embodiment, the first support plate may further be slidably connected to the first swing arm to enable the first support plate to rotate relative to the first swing link during folding of the hinge. For example, a third sliding groove may be disposed on the first support plate, a first positioning shaft may be disposed on the first swing arm, and the first positioning shaft is slidably disposed in the third sliding groove. When the first driven arm and the first swing link are relatively rotated, the first positioning shaft pushes against a side wall of the third sliding groove to rotate the first support plate around the first swing link. In an embodiment, the third sliding groove may be an arc groove, a rectilinear groove, an irregular curvilinear groove, or the like. In actual disclosure, a shape of the third sliding groove can be adjusted based on a target movement track of the first support plate.

In an embodiment, the second support plate may further be slidably connected to the second swing arm to enable the second support plate to rotate with respect to the second swing link during folding of the hinge. For example, a fourth sliding groove may be disposed on the second support plate, a second positioning shaft may be disposed on the second swing arm, and the second positioning shaft is slidably disposed in the fourth sliding groove. When the second driven arm and the second swing link are relatively rotated, the second positioning shaft pushes against a side wall of the fourth sliding groove to rotate the second support plate around the second swing link. In an embodiment, the fourth sliding groove may be an arc groove, a rectilinear groove, an irregular curvilinear groove, or the like. In actual disclosure, a shape of the fourth sliding groove can be adjusted based on a target movement track of the second support plate.

In addition, in an embodiment, the third sliding groove may alternatively be disposed on the first driven arm or the first swing arm, and the first positioning shaft may be disposed on the first support plate, so as to implement a sliding connection between the first driven arm and the first support plate, or a sliding connection between the first swing arm and the first support plate. In addition, in an embodiment, the fourth sliding groove may alternatively be disposed on the second driven arm or the second swing arm, and the second positioning shaft may be disposed on the second support plate, so as to implement a sliding connection between the second driven arm and the second support plate, or a sliding connection between the second swing arm and the second support plate.

In addition, in an embodiment, to ensure that the first folding assembly and the second folding assembly can synchronously move during folding and unfolding of the hinge, the hinge may further include a synchronization assembly, so as to implement synchronous reverse rotation (synchronous rotation toward each other and synchronous rotation away from each other) between the first folding assembly and the second folding assembly.

In an embodiment, the synchronization assembly may be in various structural forms, and may have various connection relationships with the first folding assembly and the second folding assembly.

For example, the synchronization assembly may include a gear structure and be drivingly connected to a first driven arm in the first folding assembly and a second driven arm in the second folding assembly. For example, the synchronization assembly may include a first gear and a second gear that are engaged with each other, the first gear is fastened to one end of the first driven arm (in an embodiment, the gear structure may alternatively be directly formed at the right end of the first driven arm), the second gear is fastened to one end of the second driven arm (in an embodiment, the gear structure may alternatively be directly formed at the left end of the second driven arm), an axis of the first gear coincides with a rotation axis the first driven arm on the main body, and an axis of the second gear coincides with a rotation axis of the second driven arm on the main body.

In addition, in an embodiment, the synchronization assembly may include more gears. For example, the synchronization assembly may further include an even number of driven gears, and the first and second gears may be drivingly connected using an even number of driven gears, so as to implement synchronous reverse rotation (synchronous rotation toward each other and synchronous rotation away from each other) between the first folding assembly and the second folding assembly.

In addition, to provide a certain damping effect or self-hovering capability during folding and unfolding of the hinge, in an embodiment, the hinge may further include a damping assembly; and the damping assembly may be drivingly connected to the first folding assembly and the second folding assembly to provide a damping force or a self-hovering effect when the first folding assembly and the second folding assembly are rotated, so as to improve use experience of a user In addition, this disclosure further provides a mobile terminal, including a first housing, a second housing, a flexible display, and any one of the foregoing hinges, where the first housing and the second housing are rotatably connected using the hinge.

In an implementation, the first housing may be fixedly connected to a first swing link, and a second housing may be fixedly connected to a second swing link. For example, the first housing may be fixedly connected to the first swing link by using screws or through welding, bonding, or the like, and the second housing may also be fixedly connected to the second swing link by screws or through welding or bonding, or the like. In actual disclosure, devices such as a processor, a battery, and a camera may be disposed in the first housing and the second housing.

In addition, in an embodiment, a mobile terminal may include a flexible display (for example, an OLED display), where a part of the flexible display may be fixedly connected to the first housing, and another part may be fixedly connected to the second housing. A length of the hinge can be extended or reduced as a folding angle changes during folding and unfolding of the hinge, the first swing link is fixedly connected to the first housing, and the second swing link is fixedly connected to the second housing. Therefore, during folding and unfolding of the mobile terminal, the length of the connection between the first housing, the hinge, and the second housing is extended or reduced, so that neither pressing force nor stretching force is imposed on the flexible display. When the mobile terminal is gradually unfolded, the length of the hinge is gradually reduced; and when the mobile terminal is fully unfolded (an included angle between the first housing and the second housing is 180°, the first support plate, the inner housing and the second support plate form a flat support surface, so that a good supporting function can be provided for the flexible display. When the mobile terminal is gradually folded, the length of the hinge is gradually extended, so that no compressive force is imposed on the flexible display. In addition, the first support plate, the inner housing, and the second support plate gradually enclose to form an accommodation space for accommodating the flexible display (a shape of cross section of the accommodation space may be similar to a water drop shape), so as to prevent the flexible display from being bent at a large angle, thereby avoiding occurrence of undesirable phenomena such as creases.

DESCRIPTION OF EMBODIMENTS

To make the objectives, technical solutions, and advantages of this disclosure clearer, the following further describes this disclosure in detail with reference to the accompanying drawings.

To facilitate understanding of the hinge provided in the embodiments of the present invention, the following first describes the disclosure scenario of the hinge.

Figure 1:
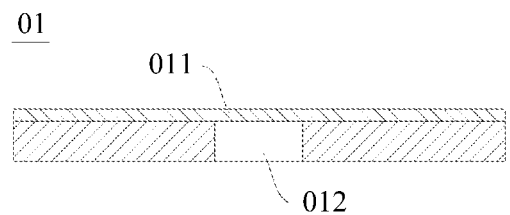
FIG. 1 is a schematic cross-sectional structural diagram of a mobile terminal in a fully unfolded state according to an embodiment of this disclosure.
Figure 2:
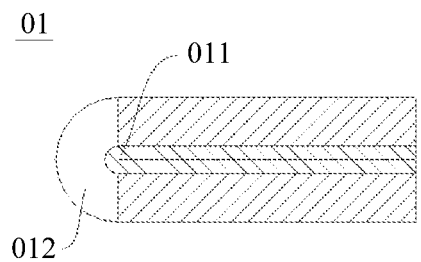
FIG. 2 is a schematic cross-sectional structural diagram of a mobile terminal in a folded state according to an embodiment of this disclosure.
Figure 3:
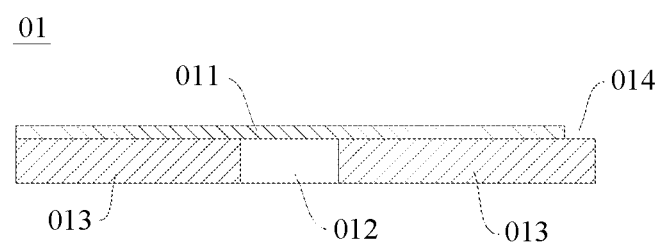
FIG. 3 is a schematic cross-sectional structural diagram of another mobile terminal in a fully unfolded state according to an embodiment of this disclosure.
Figure 4:
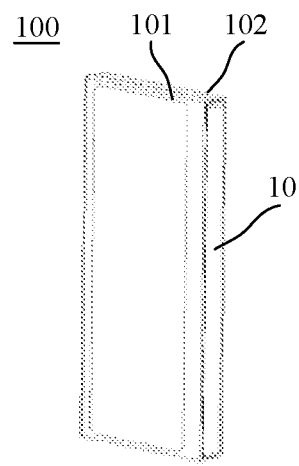
FIG. 4 is a schematic structural diagram of a mobile terminal in a folded state according to an embodiment of this disclosure.
Figure 5:
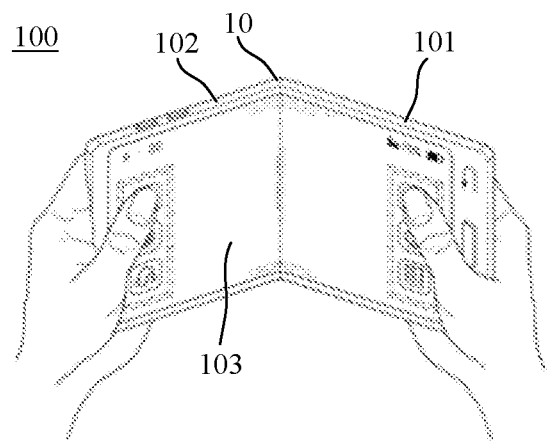
FIG. 5 is a schematic structural diagram of a mobile terminal in an unfolded state according to an embodiment of this disclosure.

The hinge provided in the embodiments of this disclosure can be applied to a foldable mobile terminal, where the foldable mobile terminal is an electronic device capable of changing its own shape through folding, rotating, or the like. Under different usage requirements, a user can fold and unfold the foldable mobile terminal to meet different requirements of the user. For example, as shown in FIG. 4, when the user needs to carry the foldable mobile terminal 100 with him, the foldable mobile terminal 100 may be folded to reduce the volume of the mobile terminal 100, thereby improving portability. As shown in FIG. 5, when the user is using the foldable mobile terminal 100, the mobile terminal 100 can be unfolded to provide a larger display area and operation area, thereby improving use convenience. In actual disclosure, the foldable mobile terminal 100 may fall into various types. For example, the foldable mobile terminal 100 may be a mobile phone, a tablet computer, a notebook computer, or an electronic book.

For example, the mobile phone may include a first housing 101 and a second housing 102 that are connected using a hinge 10. Under the action of the hinge 10, the first housing 101 and the second housing 102 may be relatively rotated, moved, or the like. A flexible display 103 (for example, an OLED display), may be disposed on surfaces of the first housing 101 and the second housing 102. When the mobile phone is deployed, the flexible display 103 may provide a large display area and operation area to improve use performance. When the mobile phone is folded, the flexible display 103 may be wrapped between the first housing 101, the hinge 10, and the second housing 102 to provide good protection for the flexible display 103, and prevent the flexible display 103 from being damaged by an external force, thereby improving safety performance of the mobile phone.

During folding and unfolding of the mobile phone, because the hinge 10 is located outside the flexible display 103, a rotation radius of the hinge 10 is greater than a rotation radius of the flexible display 103. In the hinge 10 provided in an embodiment of this disclosure, to avoid stretching or compressing the flexible display 103, a length of the hinge 10 changes during folding and unfolding of the mobile phone. For example, during folding of the mobile phone, the length of the hinge 10 can be extended, so as to avoid a compressive force on the flexible display 103; and during unfolding of the mobile phone, the length of the hinge 10 can be reduced, so as to avoid stretching force on the flexible display 103. In addition, in the folding process, the inner side of the hinge 10 is folded toward the outer side to form a space for accommodating the flexible display 103, thereby preventing the flexible display 103 from being squeezed and causing defects such as creases. In addition, no significant bulges or gaps will be formed on the outer side of the hinge 10, and therefore, integrity of the overall thickness and appearance of the mobile phone can be effectively ensured.

To make the objectives, technical solutions, and advantages of this disclosure clearer, the following further describes this disclosure in detail with reference to the accompanying drawings and specific embodiments.

The terms used in the following embodiments are intended only to describe the purpose of a particular embodiment and are not intended to limit this disclosure. The terms "one", "a" and "this" of singular forms used in this specification and the appended claims of this disclosure are also intended to include plural forms, unless otherwise specified in the context clearly. It should also be understood that in the following embodiments of this disclosure, "at least one" and "one or more" mean one or two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects.

Reference to "one embodiment", "some embodiments" or the like described in this specification means that one or more embodiments of this disclosure include a particular feature, structure, or characteristic described with reference to the embodiment. Therefore, the expressions "in one embodiment", "in some embodiments", "in some other embodiments" that appear in different parts of this specification do not necessarily mean reference to the same embodiment, but mean "one or more embodiments but not all embodiments", unless otherwise specially emphasized. The terms "include", "comprise", "have", and variations thereof mean "include, but are not limited to", unless otherwise specifically emphasized.

Figure 6:
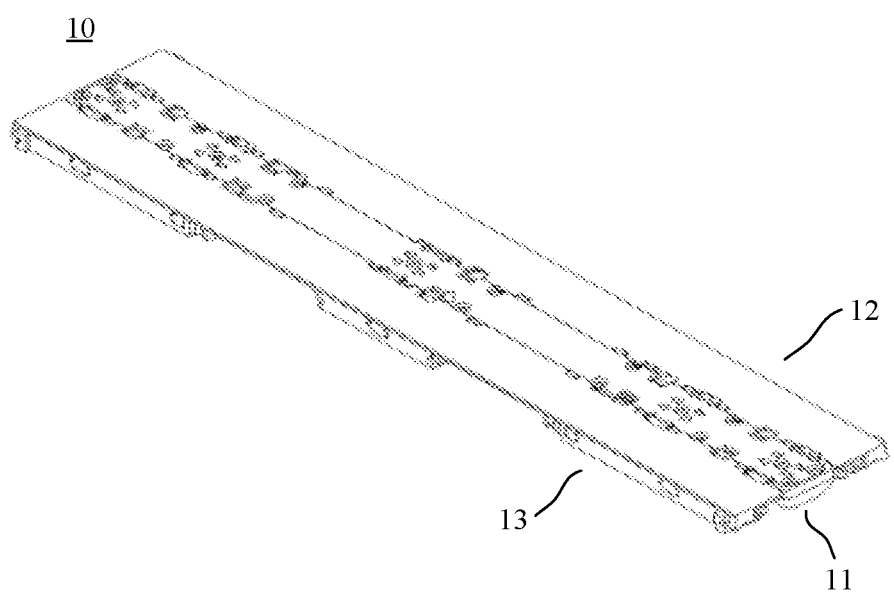
FIG. 6 is a schematic structural diagram of a hinge according to an embodiment of this disclosure.

As shown in FIG. 6, in one embodiment of this disclosure, a hinge 10 includes a main body 11, and a first folding assembly 12 and a second folding assembly 13 that are symmetrically disposed along the main body 11. The first folding assembly 12 and the second folding assembly 13 can rotate toward or away from each other relative to the main body 11, so as to implement a folding function of the hinge 10.

Figure 7:
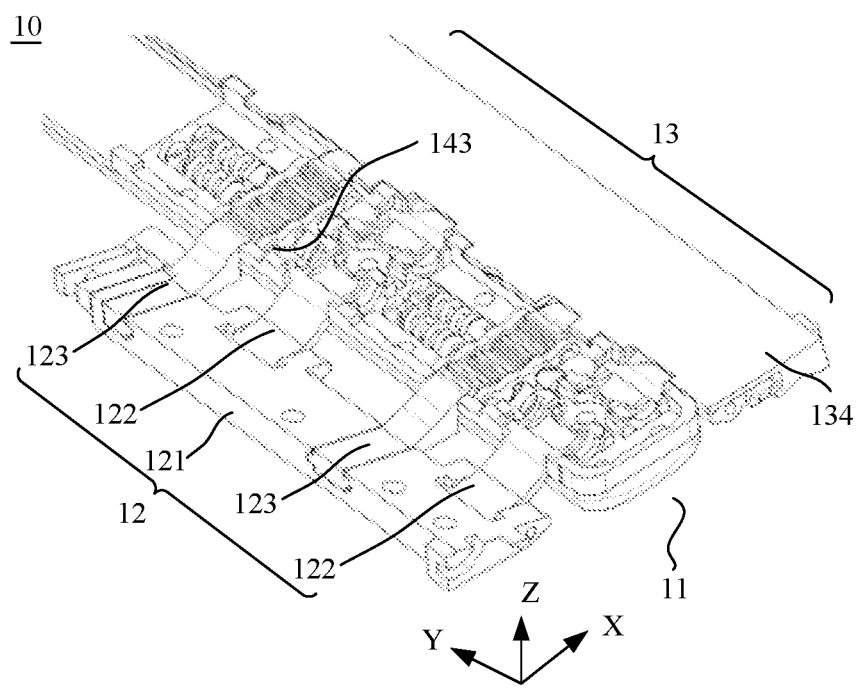
FIG. 7 is a partial schematic structural diagram of a hinge according to an embodiment of this disclosure.

Referring to FIG. 7, for example, the first folding assembly 12 may include a first swing link 121, a first swing arm 122, a first driven arm 123, and a first support plate (not shown in the figure). One end (right end in the figure) of the first swing arm 122 is rotatably connected to the main body 11, and the other end (left end in the figure) is rotatably connected to the first swing link 121. One end (right end in the figure) of the first driven arm 123 is rotatably connected to the main body 11, and the other end (left end in the figure) is slidably connected to the first swing link 121. Rotation axes of the first driven arm 123 and the first swing arm 122 on the main body 11 are parallel to each other and do not coincide, so that a length of the first folding assembly 12 changes when the first folding assembly 12 is rotated relative to the main body 11.

The first support plate 124 is rotatably connected to the first swing link 121 and slidably connected to the first swing arm 122 or the first driven arm 123. When the first folding assembly 12 is rotated relative to the main body 11, the first support plate 124 can rotate relative to the first swing link 121 under the driving force of the first swing arm 122 or the first driven arm 123, so as to provide a supporting function for the flexible display or enclose with the main body 11 to form an accommodation space for accommodating the flexible display.

Figure 8:
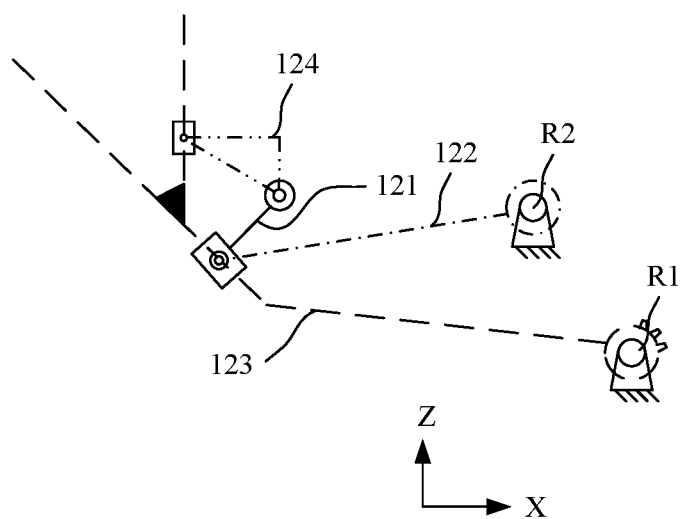
FIG. 8 is a simplified diagram of a mechanism of a first folding assembly according to an embodiment of this disclosure.

For example, FIG. 8 is a simplified diagram of a mechanism of a first folding assembly 12. The first swing link 121 (represented by a solid line in the figure), the first swing arm 122 (represented by a dash-dotted line in the figure), and the first driven arm 123 (represented by a dashed line in the figure) may constitute a crank slider mechanism through a rotational connection and a sliding connection. When an external force acts on the first swing link 121 to rotate the first swing link 121, the first swing link 121 may drive the first driven arm 123 to rotate synchronously through sliding cooperation between the first swing link 121 and the first driven arm 123, and the first swing link 121 may also drive the first swing arm 122 to rotate. Because a rotation axis R1 of the first driven arm 123 on the main body 11 and a rotation axis R2 of the first swing arm 122 on the main body 11 do not coincide, during rotation, the first swing link 121 slides relative to the first driven arm 123, causing an included angle between the first swing link 121 and the first swing arm 122 to change, and finally causing a link mechanism constituted by the first swing link 121 and the first swing arm 122 to extend or contract; that is, the length of the first folding assembly 12 may be increased or decreased. A first support plate 124 (shown as a double-dot dashed line) is rotatably connected to the first swing link 121. When the first support plate 124 is slidably connected to the first swing arm 122, the included angle between the first swing arm 122 and the first swing link 121 changes, and the first swing arm 122 can drive the first support plate 124 to rotate relative to the first swing link 121 through sliding cooperation with the first support plate 124. When the first support plate 124 is slidably connected to the first driven arm 123, the first driven arm 123 can drive the first support plate 124 to rotate relative to the first swing link 121 through sliding cooperation with the first support plate 124 after relative sliding between the first driven arm 123 and the first swing link 121.

Referring to FIG. 7 and FIG. 8, for example, the rotation axis of the first swing arm 122 on the main body 11 is offset from the rotation axis of the first driven arm 123 on the main body 11 in the positive direction of the Z-axis. When the hinge 10 is folded, an external force acts on the first swing link 121 to rotate clockwise, and the first swing link 121 drives the first swing arm 122 and the first driven arm 123 to rotate clockwise. During movement, the included angle between the first swing link 121 and the first swing arm 122 becomes larger, so that the link mechanism formed by the first swing link 121 and the first swing arm 122 is extended, so as to increase the length of the first folding assembly 12.

Figure 9:
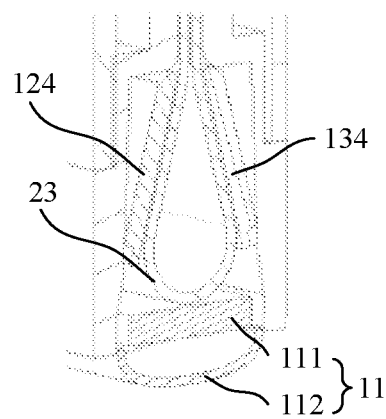
FIG. 9 is a local schematic cross-sectional structural diagram of a hinge according to an embodiment of this disclosure.

The first support plate 124 is rotatably connected to the first swing link 121. When the first support plate 124 is slidably connected to the first driven arm 123, referring to FIG. 9, during folding of the hinge 10, because the first swing link 121 slides outward relative to the first driven arm 123, the first driven arm 123 drives the first support plate 124 to rotate clockwise relative to the first swing link 121, so that an accommodation space for accommodating the flexible display (the curvilinear portion of the flexible display) is gradually formed between the first support plate 124 and the main body 11.

Figure 10:
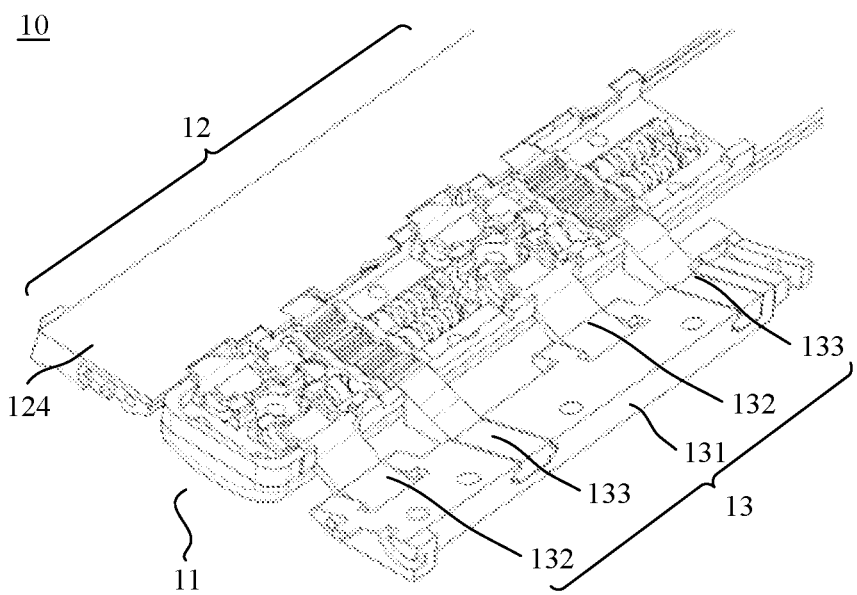
FIG. 10 is a partial schematic structural diagram of a hinge according to an embodiment of this disclosure.

As shown in FIG. 10, in one embodiment of this disclosure, the second folding assembly 13 may include a second swing link 131, a second swing arm 132, a second driven arm 133, and a second support plate (not shown in the figure). One end (left end in the figure) of the second swing arm 132 is rotatably connected to the main body 11, and the other end (right end in the figure) is rotatably connected to the second swing link 131. One end (left end in the figure) of the second driven arm 133 is rotatably connected to the main body 11, and the other end (right end in the figure) is slidably connected to the second swing link 131. Rotation axes of the second driven arm 133 and the second swing arm 132 on the main body 11 are parallel to each other and do not coincide, so that a length of the second folding assembly 13 changes when the second folding assembly 13 is rotated relative to the main body 11.

The second support plate is rotatably connected to the second swing link 131 and slidably connected to the second swing arm 132 or the second driven arm 133. When the second folding assembly 13 is rotated relative to the main body 11, the second support plate can rotate relative to the second swing link 131 under the driving force of the second swing arm 132 or the second driven arm 133 to provide a supporting function for the flexible display or to enclose with the main body 11 to form an accommodation space for accommodating the flexible display.

It can be understood that the first folding assembly 12 and the second folding assembly 13 may be disposed symmetrically relative to the main body 11, and the basic structural composition and the principle of movement of the second folding assembly 13 may be the same as those of the first folding assembly 12. Therefore, for the structural composition and the principle of movement of the second folding assembly 13, reference may be made to the foregoing description of the first folding assembly 12. Details are not described herein.

A connection structure between the components of the first folding assembly 12 and a connection structure between the first folding assembly 12 and the main body 11 are described in detail below. For a connection structure between the components of the second folding assembly 13, reference may be made to the description of the first folding assembly 12.

Figure 11:
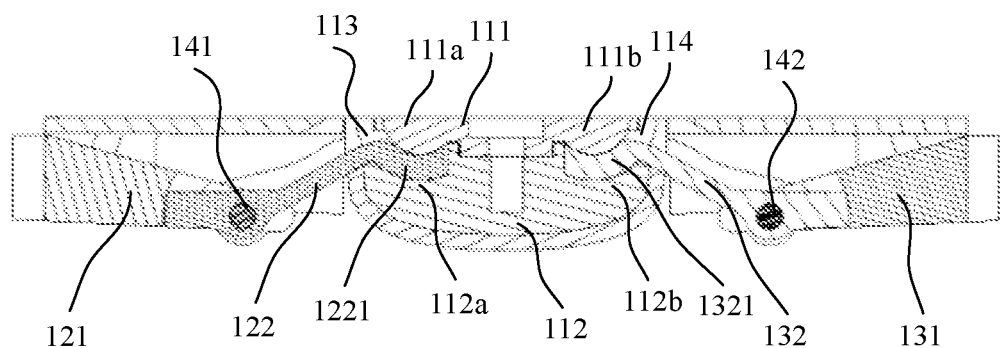
FIG. 11 is a schematic cross-sectional structural diagram of a hinge according to an embodiment of this disclosure.

As shown in FIG. 11, in one embodiment of this disclosure, for example, the first swing arm 122 and the main body 11 may be rotatably connected using a virtual shaft.

For example, the main body 11 may include an outer housing 112 and an inner housing 111, an arc recess 112$a$ may be disposed in the outer housing 112$a$, and an arc projection 111$a$ may be disposed in the inner housing 111. After the outer housing 112 and the inner housing 111 are snap-fit and fastened, the arc recess 112$a$ and the arc projection 111$a$ are snap-fit to form a first arc groove 113; that is, an arc gap is formed between the arc recess 112$a$ and the arc projection 111$a$. A first arc shaft 1221 is disposed at one end of the first swing arm 122, and a rotational connection between the first swing arm 122 and the main body 11 may be implemented by fitting the first arc shaft 1221 into the first arc groove 113. Through the virtual shaft connection, a connection structure between the first swing arm 122 and the main body 11 can be well concealed in the main body 11, thereby improving integrity and use experience of the hinge 10.

In an embodiment, the first arc groove 113 may be one fourth of an arc, one third of an arc, or the like, and the first arc shaft 1221 may be one fourth of an arc, one third of an arc, or the like. Specific parameters of the first arc groove 113 and the first arc shaft 1221 may be adjusted by a person skilled in the art based on actual requirements. This is not specifically limited in this disclosure.

For example, the second swing arm 132 and the main body 11 may also be rotatably connected using a virtual shaft. In brief, an arc recess 112$b$ may be disposed in the outer housing 112, and an arc projection 111$b$ may be disposed in the inner housing 111. After the outer housing 112 and the inner housing 111 are snap-fit and fastened, the arc recess 112$b$ and the arc projection 111$b$ are snap-fit to form a second arc groove 114; that is, an arc gap is formed between the arc recess 112$b$ and the arc projection 111$b$. A second arc shaft 1321 is disposed at one end of the second swing arm 132, and a rotational connection between the second swing arm 132 and the main body 11 may be implemented by fitting the second arc shaft 1321 in the second arc groove 114. Through the virtual shaft connection, a connection structure between the second swing arm 132 and the main body 11 can be well concealed in the main body 11, thereby improving integrity and use experience of the hinge 10.

In addition, in an embodiment, the first swing arm 122 and the main body 11 may be rotatably connected using a pin shaft or in another manner.

For example, in one embodiment of this disclosure, for example, the first swing arm 122 and the first swing link 121 may be rotatably connected using a pin shaft.

For example, a first shaft hole (not shown in the figure) is disposed at one end of the first swing arm 122 (left end in the figure), and a second shaft hole (not shown in the figure)

is disposed at one end of the first swing link 121 (right end in the figure). The pin shaft 141 is threaded through the first shaft hole and the second shaft hole, so as to implement the rotational connection between the first swing arm 122 and the first swing link 121.

For example, the second swing arm 132 and the second swing link 131 may be rotatably connected using a pin shaft.

For example, a third shaft hole (not shown in the figure) may be disposed at one end of the second swing arm 132 (right end in the figure), and a fourth shaft hole (not shown in the figure) may be disposed at one end of the second swing link 131 (left end in the figure). The pin shaft 142 is threaded through the third shaft hole and the fourth shaft hole, so as to implement the rotational connection between the second swing arm 132 and the second swing link 131.

In an embodiment, the first swing arm 122 and the first swing link 121 may be rotatably connected using a virtual shaft as described above, or may be rotatably connected in another manner. The second swing arm 132 and the second swing link 131 may be rotatably connected using a virtual shaft as described above, or may be rotatably connected in another manner. This is not specifically limited in this disclosure.

In an embodiment, the first driven arm 123 and the main body 11 may be rotatably connected using a virtual shaft or pin shaft as described above, or may be rotatably connected in another manner.

For example, referring to FIG. 7, in an embodiment of this disclosure, the first driven arm 123 and the main body 11 are rotatably connected using a pin shaft. For example, a shaft hole (not shown in the figure) is disposed at one end (right end in the figure) of the first driven arm 123, and a pin shaft 143 fastened in the main body 11 is threaded through the shaft hole of the first driven arm 123, so as to implement a rotational connection between the first driven arm 123 and the main body 11.

Figure 12:
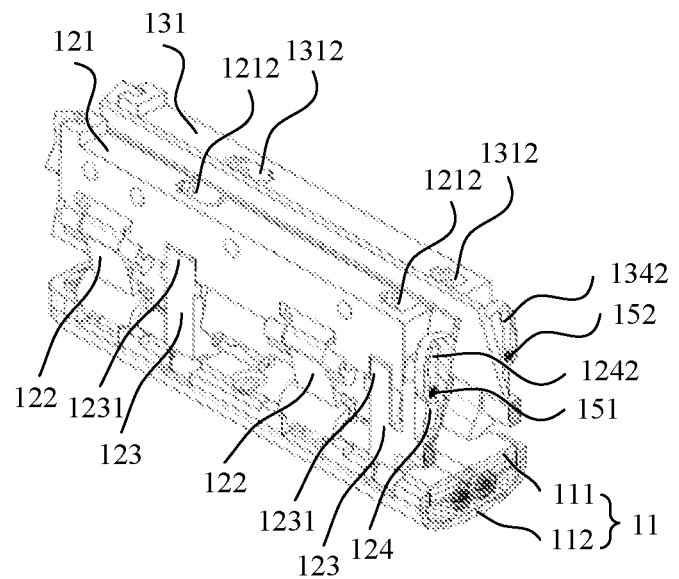
FIG. 12 is a partial schematic structural diagram of a hinge according to an embodiment of this disclosure.
Figure 13:
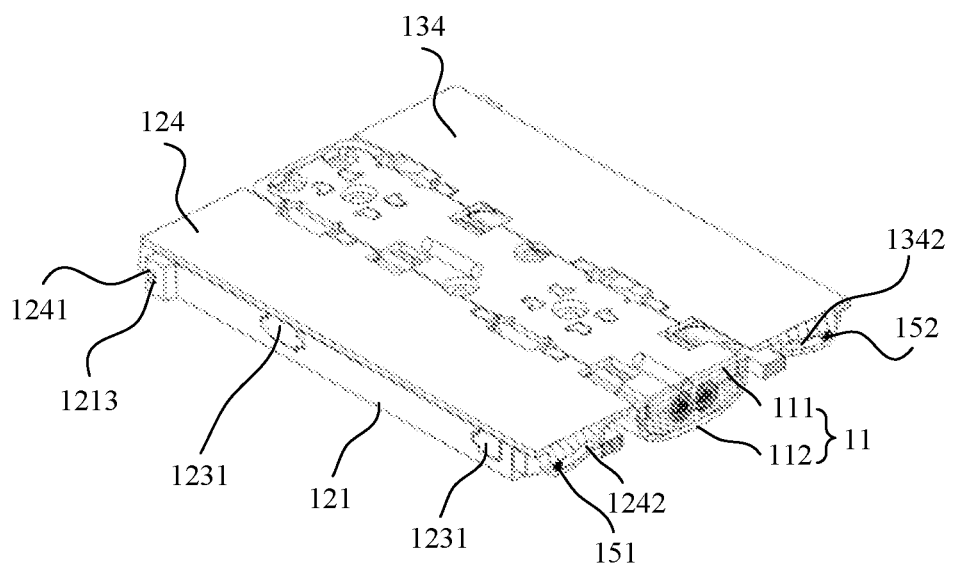
FIG. 13 is a partial schematic structural diagram of a hinge according to an embodiment of this disclosure.

In addition, as shown in FIG. 12 and FIG. 13, to implement a sliding connection between the first driven arm 123 and the first swing link 121, in an embodiment of this disclosure, a first sliding groove 1212 may be disposed in the first swing link 121, a first sliding rail 1231 may be disposed in the first driven arm 123, and the first sliding rail 1231 may be slidably disposed in the first sliding groove 1212, so as to implement a sliding connection between the first driven arm 123 and the first swing link 121.

In an embodiment, the first sliding groove 1212 may alternatively be disposed on the first driven arm 123, and the first sliding rail 1231 may alternatively be disposed on the first swing link 121. In addition, the first sliding groove 1212 and the first sliding rail 1231 may be in various shapes. For example, in an embodiment of this disclosure, cross sections of the first sliding groove 1212 and the first sliding rail 1231 are cross-shaped. In another embodiment, the cross sections of the first sliding groove 1212 and the first sliding rail 1231 may alternatively be trapezoidal, triangular, or the like. Details are not described in this disclosure.

In addition, to implement the sliding connection between the second driven arm 133 and the second swing link 131, in an embodiment of this disclosure, a second sliding groove 1312 may be disposed in the second swing link 131, a second sliding rail (not shown in the figure) may be disposed in the second driven arm (not shown in the figure), and the second sliding rail may be slidably disposed in the second sliding groove 1312, so as to implement a sliding connection between the second driven arm and the second swing link 131.

In an embodiment, the second sliding groove 1312 may alternatively be disposed on the second driven arm, and the second sliding rail may alternatively be disposed on the second swing link 131. In addition, the second sliding groove 1312 and the second sliding rail may be in various shapes. For example, in an embodiment of this disclosure, cross sections of the second sliding groove 1312 and the second sliding rail are cross-shaped. In another embodiment, the cross sections of the second sliding groove 1312 and the second sliding rail may alternatively be trapezoidal, triangular, or the like. Details are not described in this disclosure.

In addition, in an embodiment, the first support plate 124 and the first swing link 121 may be rotatably connected using a virtual shaft as described above, or may be rotatably connected using a pin shaft, or may be rotatably connected in another manner.

For example, as shown in FIG. 13, in one embodiment of this disclosure, the first support plate 124 and the first swing link 121 is rotatably connected using a virtual shaft. For example, a third arc groove 1213 is disposed on the first swing link 121, and a third arc shaft 1241 matching the third arc groove 1213 is disposed on the first support plate 124, and the third arc shaft 1241 is disposed in the third arc groove 1213, so as to implement a rotational connection between the first support plate 124 and the first swing link 121.

Through the virtual shaft connection, the third arc groove 1213 and the third arc axis 1241 can be well concealed, so that the third arc groove 1213 and the third arc axis 1241 are not exposed, and visual integrity of the hinge 10 can be improved.

In an embodiment, the first support plate 124 and the first swing link 121 may be rotatably connected using a pin shaft, or may be rotatably connected in another manner. This is not specifically limited in this disclosure.

In an embodiment, the second support plate 134 and the second swing link 131 may be rotatably connected using a virtual shaft as described above. In brief, a structure the same as the third arc groove 1213 may be disposed on the second swing link 131, and a structure the same as the third arc shaft 1241 may be disposed on the second support plate 134, so as to implement a rotational connection between the second support plate 134 and the second swing link 131.

To enable the first support plate 124 to rotate relative to the first swing link 121 during folding of the hinge 10, in one embodiment of this disclosure, the first support plate 124 is slidably connected to the first driven arm 123.

For example, as shown in FIG. 13, a third sliding groove 1242 is disposed on the first support plate 124, a positioning shaft 151 is disposed on the first driven arm 123, and the positioning shaft 151 is slidably disposed in the third sliding groove 1242. When a relative sliding movement occurs between the first driven arm 123 and the first swing link 121, the positioning shaft 151 located on the first driven arm 123 pushes against a side wall of the third sliding groove 1242 to rotate the first support plate 124 around the first swing link 121.

In an embodiment, the third sliding groove 1242 may be an arc groove, a rectilinear groove, an irregular curvilinear groove, or the like. In actual disclosure, a shape of the third sliding groove 1242 may be adjusted based on a target movement track of the first support plate 124.

For example, referring to FIG. 12, in an embodiment of this disclosure, after the hinge 10 is folded, the first support plate 124 is rotatably connected to the left end of the first swing link 121 (the third arc groove 1213 is disposed close to the left end of the first swing link 121), so that the first support plate 124, the second support plate 134, and the main body 11 (the inner housing 111) can enclose to form an accommodation space. When the hinge 10 is folded, the first swing link 121 rotates clockwise and slides outward along the first driven arm 123, and the positioning shaft 141 pushes against a side wall of the third sliding groove 1242 and slides inside the third sliding groove 1242, so that the first support plate 124 rotates clockwise relative to the first swing link 121, thereby gradually forming the accommodation space between the first support plate 124 and the main body 11 (the inner housing 111). When the hinge 10 is unfolded, the first swing link 121 rotates counterclockwise and slides inward along the first driven arm 123, and the positioning shaft 141 pushes against a side wall of the third sliding groove 1242 and slides in the third sliding groove 1242, so that the first support plate 124 rotates counterclockwise relative to the first swing link 121. When the hinge 10 is fully unfolded, an upper surface of the first support plate 124 is flush with an upper surface of the main body 11 (inner housing 111), thereby providing a flat support surface for the flexible display.

Figure 14:
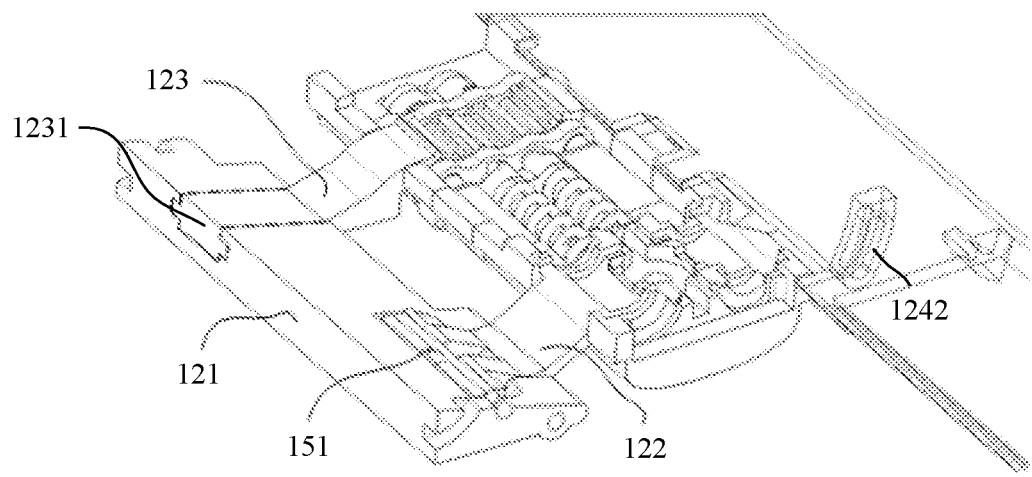
FIG. 14 is a partial schematic structural diagram of a hinge according to an embodiment of this disclosure.

In addition, as shown in FIG. 14, in an embodiment, because the included angle between the first swing arm 122 and the first swing link 121 during unfolding and folding of the hinge 10 is also changed, in an embodiment, the positioning shaft 151 for driving the rotation of the first support plate 124 may alternatively be disposed on the first swing arm 122 and slidably cooperate with the third sliding groove 1242.

In addition, in an embodiment, the third sliding groove 1242 may be disposed on the first driven arm 123 or the first swing arm 122, and the positioning shaft 151 may be disposed on the first support plate 124, so as to implement a sliding connection between the first driven arm 123 and the first support plate 124, or a sliding connection between the first swing arm 122 and the first support plate 124.

As shown in FIG. 13, in an embodiment, a structural composition of the second folding assembly 13 may be the same as that of the first folding assembly 12 and disposed symmetrically relative to the main body 11. In brief, a fourth sliding groove 1342 may be disposed on the second support plate 134, a positioning shaft 152 may be disposed on the second driven arm 133, and the positioning shaft 152 may be slidably disposed in the fourth sliding groove 1342. When a relative sliding movement occurs between the second driven arm 133 and the second swing link 131, the positioning shaft 152 located on the second driven arm 133 pushes against a side wall of the fourth sliding groove 1342 to rotate the second support plate 134 around the second swing link 131. For an operation principle of the second folding assembly 13, reference may be made to related description of the first folding assembly 12. Details are not described herein.

In addition, in an embodiment, to ensure that the first folding assembly 12 and the second folding assembly 13 can synchronously move during folding and unfolding of the hinge 10, in one embodiment of this disclosure, the hinge 10 may further include a synchronization assembly, so as to implement synchronous reverse rotation (synchronous rotation toward each other and synchronous reverse rotation away from each other) between the first folding assembly 12 and the second folding assembly 13.

In an embodiment, the synchronization assembly may be in various structural forms, and may have various connection relationships with the first folding assembly 12 and the second folding assembly 13.

Figure 15:
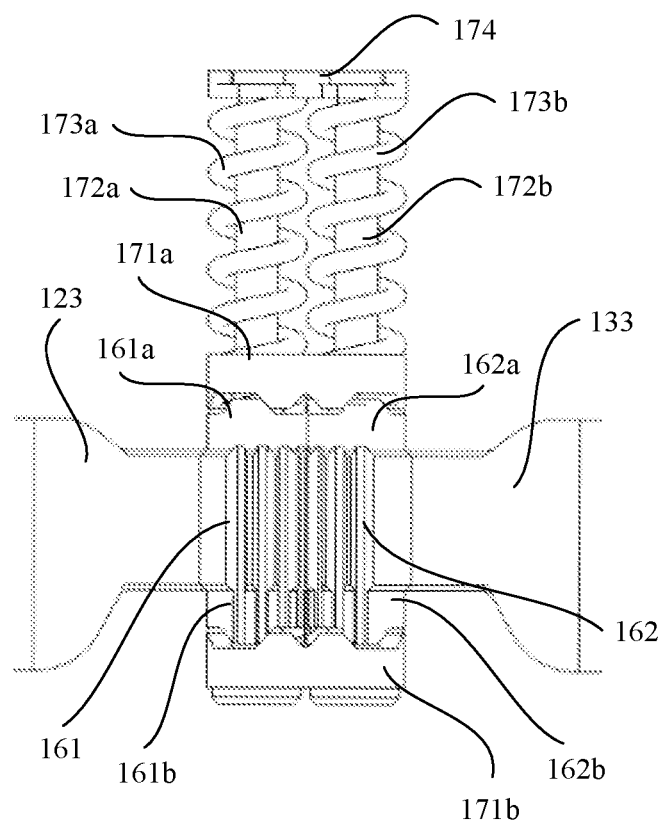
FIG. 15 is a partial schematic structural diagram of a hinge according to an embodiment of this disclosure.

For example, as shown in FIG. 15, in one embodiment of this disclosure, the synchronization assembly may include a gear structure and be drivingly connected to the first driven arm 123 and the second driven arm 133.

For example, the synchronization assembly may include a first gear 161 and a second gear 162 that are engaged with each other, the first gear 161 is fastened to one end of the first driven arm 123 (in an embodiment, the gear structure may alternatively be directly formed at the right end of the first driven arm 123), the second gear 162 is fastened to one end of the second driven arm 133 (in an embodiment, the gear structure may alternatively be directly formed at the left end of the second driven arm 133), an axis of the first gear 161 coincides with a rotation axis of the first driven arm 123 on the main body 11, and an axis of the second gear 162 coincides with a rotation axis of the second driven arm 133 on the main body 11.

In an embodiment, to provide a damping effect or self-hovering capability during folding and unfolding of the hinge 10, the hinge 10 may further include a damping assembly. The damping assembly may be drivingly connected to the first folding assembly 12 and the second folding assembly 13 to provide a damping force or a self-hovering effect when the first folding assembly 12 and the second folding assembly 13 are rotated, so as to improve use experience of a user.

For example, in one embodiment of this disclosure, a cam structure 161*a* is disposed at one end (upper end in the figure) of the first gear 161, and a cam structure 161*b* is disposed at the other end (lower end in the figure). A cam structure 162*a* is disposed at one end (upper end in the figure) of the second gear 162, and a cam structure 162*b* is provided at the other end (lower end in the figure). A conjoined cam 171*a* is disposed on the upper side of the cam structure 161*a* and a cam structure 162*a*, and a conjoined cam 171*b* is disposed on the lower side of the cam structure 161*b* and a cam structure 162*b*. The conjoined cam 171*a* is slidable in longitudinal directions (up and down directions in the figure) of the camshaft 172*a* and the camshaft 172*b*, the conjoined cam 171*b* is fastened to the lower ends of the camshaft 172*a* and the camshaft 172*b*, and the camshaft 172*a* and the camshaft 172*b* are slidable up and down. One end (upper end) of an abutment spring 173*a* and an abutment spring 173*b* abuts against the retainer spring 174, and the other end (lower end) abuts against the conjoined cam 171*a*, so that the conjoined cam 171*a* abuts against the cam structure 161*a* and the cam structure 162*a*, and the conjoined cam 171*b* abuts against the cam structure 161*b* and the cam structure 162*b*. When the first driven arm 123 or the second driven arm 133 is rotated, the synchronous reverse rotation is implemented through engagement between the first gear 161 and the second gear 162, the cam structures 161*a* and 161*b* rotate synchronously with the first gear 161, and the cam structures 162*a* and 162*b* rotate synchronously with the second gear 162. In this process, the cam structure 161*a* and the cam structure 162*a* rotate relative to the conjoined cam 171*a*, and the cam structure 161*b* and the cam structure 162*b* rotate relative to the conjoined cam 171*b*. When the convex portions of the cam structure 161*a* and the cam structure 162*a* tend to slide out of the concave portions of the conjoined cam 171*a*, and the convex portions of the cam structure 161*b* and the cam structure 162*b* tend to slide out of the concave portions of the conjoined cam 171*b*, the abutment spring 173*a* and the abutment spring 173*b* are compressed, so that a certain damping force can be provided, and the convex portions of the cam structure 161*a* and the cam structure 162*a* can be held in the concave portions of the conjoined cam 171*a* to a certain extent, and the convex portions of the cam structure 161*b* and the cam structure 162*b* can be held in the concave portions of the conjoined cam 171*b* to achieve a self-hovering effect.

For example, when the hinge 10 is in a fully unfolded state (or the mobile terminal is in the fully unfolded state), the convex portions of the cam structure 161*a* and the cam structure 162*a* may be located just inside the concave portion of the conjoined cam 171*a*, and the convex portions of the cam structure 161*b* and the cam structure 162*b* may be located just inside the concave portion of the conjoined cam 171*b*, so that the hinge 10 (or the mobile terminal) can maintain the specific angle, and when the user operates the mobile terminal (for example, touches or presses the flexible display), the mobile terminal is not easily folded under the external force, so as to improve use experience of the user. Alternatively, when the hinge 10 is in a fully folded state (or the mobile terminal is in the fully folded state), the convex portions of the cam structure 161*a* and the cam structure 162*a* may be located just inside the concave portion of the conjoined cam 171*a*, and the convex portions of the cam structure 161*b* and the cam structure 162*b* may be located just inside the concave portion of the conjoined cam 171*b*, so that the hinge 10 (or the mobile terminal) can maintain the specific angle, thereby preventing the mobile terminal from being freely unfolded under the external force, thereby ensuring safety of the mobile terminal.

In an embodiment, the cam structure 161*a*, the cam structure 161*b*, the first gear 161, and the first driven arm 123 may be an integral structure or may be separate structural members. Correspondingly, the cam structure 162*a*,the cam structure 162*b*,the second gear 162, and the second driven arm 133 may be an integral structure or may be separate structural members. In addition, in an embodiment, the damping assembly is not limited to the structural form disclosed in the foregoing embodiment. For example, the cam structure 161*b*, the cam structure 162*b*,and the conjoined cam 171*b* may be omitted.

In addition, in an embodiment, the synchronization assembly is not limited to the structure disclosed in the foregoing embodiment. For example, a pulley mechanism or another drive mechanism may be used between the first driven arm 123 and the second driven arm 133 to implement synchronous rotation; or more gears may be added between the first gear 161 and the second gear 162.

Figure 16:
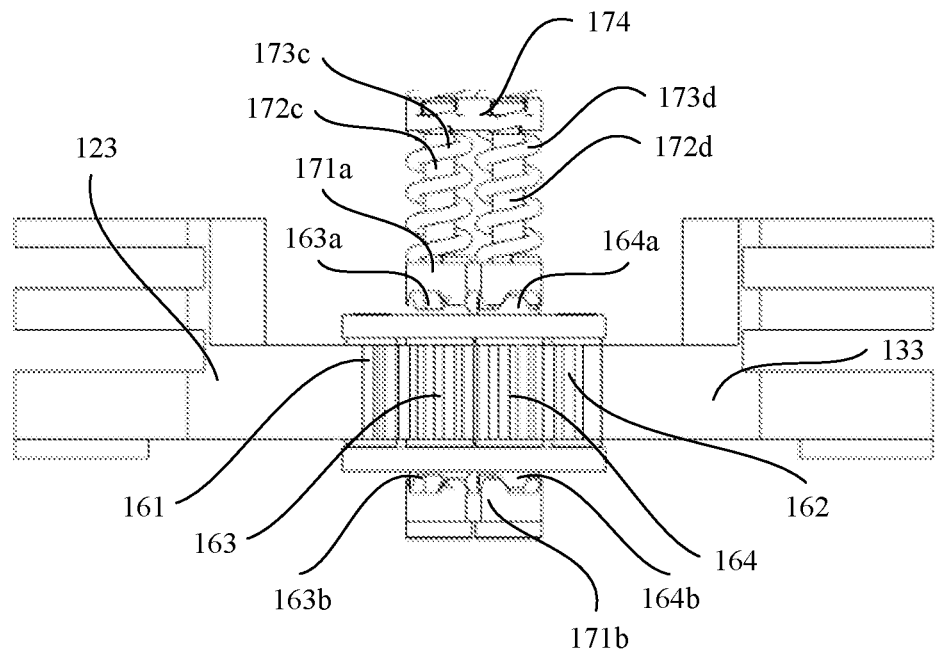
FIG. 16 is a partial schematic structural diagram of another hinge according to an embodiment of this disclosure.

For example, as shown in FIG. 16, in another embodiment of this disclosure, a driven gear 163 and a driven gear 164 that are engaged with each other are provided between the first gear 161 and the second gear 162, the driven gear 163 is engaged with the first gear 161, and the driven gear 164 is engaged with the second gear 162; that is, the first driven arm 123 and the second driven arm 133 rotate synchronously through the first gear 161, the second gear 162, the driven gear 163, and the driven gear 164.

The damping assembly may be disposed as follows: A cam structure 163*a* is disposed at one end (upper end in the figure) of the driven gear 163, and a cam structure 163*b* is disposed at the other end (lower end in the figure); a cam structure 164*a* is disposed at one end (upper end in the figure) of the driven gear 164, and a cam structure 164*b* is disposed at the other end (lower end in the figure); and the conjoined cam 171*a* is disposed on the upper side of the cam structure 163*a* and the cam structure 164*a*, and the conjoined cam 171*b* is disposed on the lower side of the cam structure 163*b* and the cam structure 164*b*. The conjoined cam 171*a* is slidable in longitudinal directions (up and down directions in the figure) of the camshaft 172*c* and the camshaft 172*d*, the conjoined cam 171*b* is fastened to the lower ends of the camshaft 172*c* and the camshaft 172*d*, and the camshaft 172*c* and the camshaft 172*d* are slidable up and down. One end (upper end) of the abutment spring 173*c* and the abutment spring 173*d* abuts against the retainer spring 174, and the other end (lower end) abuts against the conjoined cam 171*a*, so that the conjoined cam 171*a* abuts against the cam structure 163*a* and the cam structure 164*a*, and the conjoined cam 171*b* abuts against the cam structure 163*b* and the cam structure 164*b*. When the first driven arm 123 or the second driven arm 133 is rotated, synchronous reverse rotation is implemented through engagement between the first gear 161, the driven gear 163, the driven gear 164, and the second gear 162, the cam structures 163*a* and 163*b* rotate synchronously with the driven gear 163, and the cam structures 164*a* and 164*b* rotate synchronously with the driven gear 164. In this process, the cam structure 163*a* and the cam structure 164*a* rotate relative to the integral cam 171*a*, and the cam structure 163*b* and the cam structure 164*b* rotate relative to the integral cam 171*b*; when the convex portions of the cam structure 163*a* and the cam structure 164*a* tend to slide out of the concave portions of the conjoined cam 171*a*, and the cam structure 163*b*, and the convex portions of the cam structure 164*b* tend to slide out of the concave portions of the conjoined cam 171*b*, the abutment spring 173*c* and the abutment spring 174*d* are compressed, so that a certain damping force can be provided, and to some extent, the convex portions of the cam structure 163*a* and the cam structure 164*a* can be held in the concave portions of the conjoined cam 171*a*, and the convex portions of the cam structure 163*b* and the cam structure 164*b* can be held in the concave portions of the conjoined cam 171*b* to achieve a self-hovering effect.

In an embodiment, the number of components in a damping assembly may also be increased or decreased.

Figure 17:
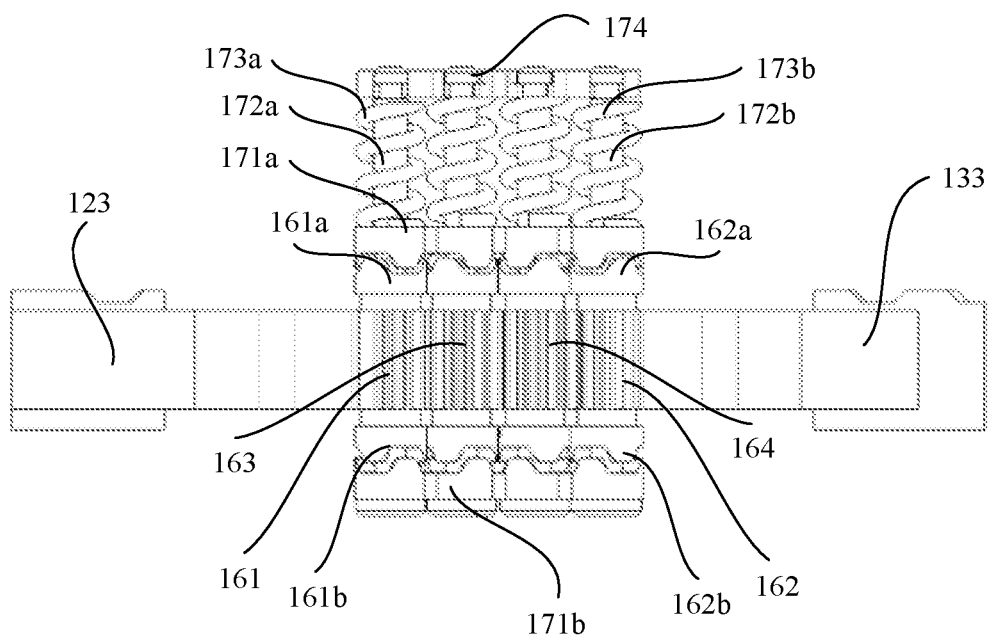
FIG. 17 is a partial schematic structural diagram of still another hinge according to an embodiment of this disclosure.

For example, as shown in FIG. 17, in one embodiment of this disclosure, to provide a greater damping effect and a more stable self-hovering effect for the hinge 10, the first gear 161, the second gear 162, the driven gear 163, and the driven gear 164 are provided with a cam structure at both the upper end and the lower end, and are provided with a conjoined cam adapted to the cam structure at the upper end. For the operation principle, reference may be made to the description in the foregoing embodiment. Details are not described herein.

It can be understood that, in an embodiment, the damping assembly is not limited to the foregoing structural form, but another structural form may be used to provide a certain rotational damping force for the hinge 10 or implement a self-hovering function. This is not specifically limited in this disclosure.

In addition, in an embodiment, the damping assembly may be drivingly connected to the first swing arm 122, the second swing arm 132, or another movable member in addition to the first driven arm 123 and the second driven arm 133.

In addition, in an embodiment, the first folding assembly 12 may include one or more first swing links 121, first swing arms 122, first driven arms 123, first support plates 124, and the like. The second folding assembly 13 may also include one or more second swing links 131, second swing arms 132, second driven arms 133, second support plates 134, and the like. In addition, the hinge 10 may also include a plurality of synchronization assemblies or damping assemblies described above.

Figure 18:
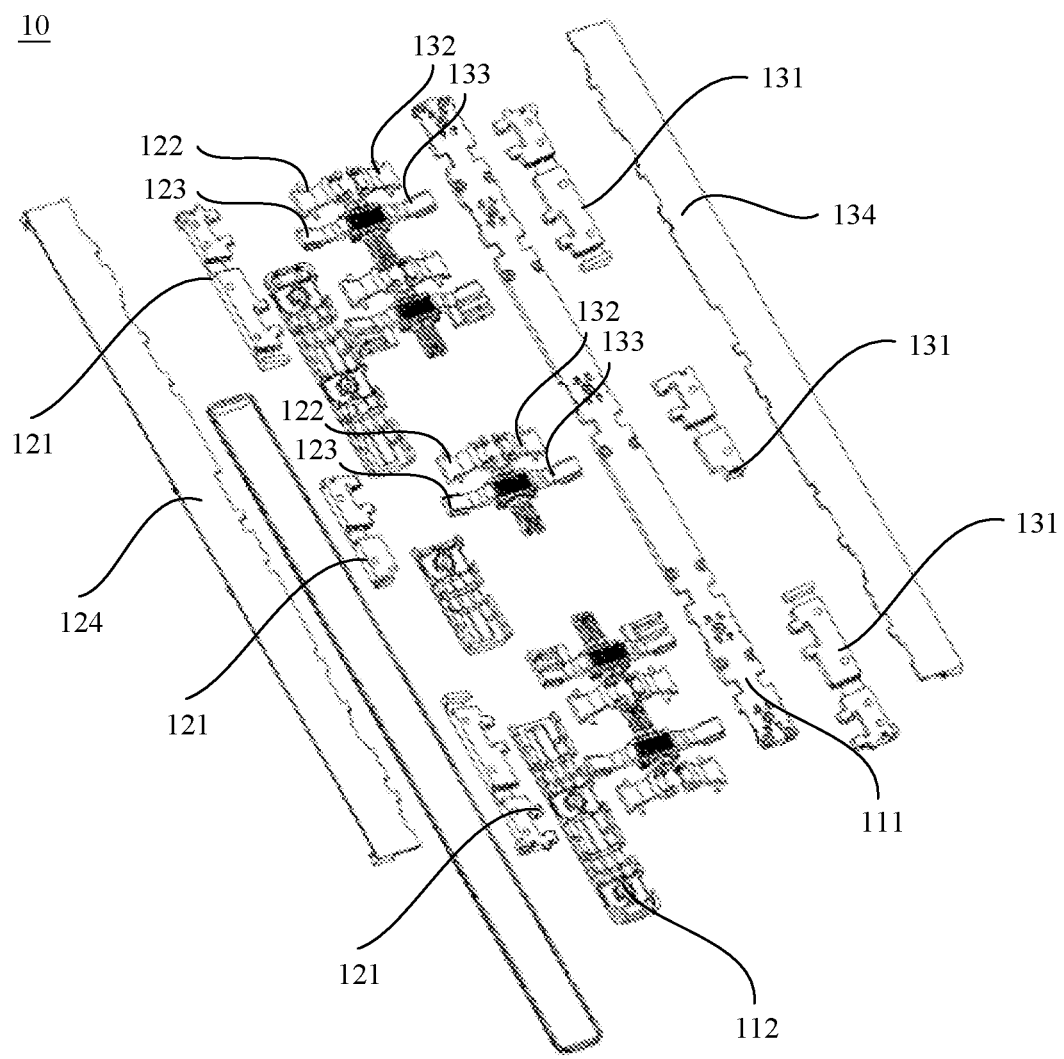
FIG. 18 is a schematic diagram of structure decomposition of a hinge according to an embodiment of this disclosure.

For example, as shown in FIG. 18, the first folding assembly 12 may include one first support plate 124 and three first swing links 121, where two first swing links 121 may be disposed at both ends of the first support plate 124, and the other first swing link 121 may be disposed at the middle of the first support plate 124. In addition, the first folding assembly 12 may include a plurality of first swing arms 122 and a plurality of first driven arms 123, each of the first swing links 121 is rotatably connected to one or more first swing arms 122, and each of the first swing links 121 is slidably connected to the plurality of first driven arms 123.

In addition, the second folding assembly 13 may also include one second support plate 134 and three second swing links 131, where two second swing links 131 may be disposed at both ends of the second support plate 134, and the other second swing link 131 may be disposed at the middle of the second support plate 134. In addition, the second folding assembly 13 may include a plurality of second swing arms 132 and a plurality of second driven arms 133, each second swing link 131 is rotatably connected to one or more second swing arms 132, and each second swing link 131 is slidably connected to the plurality of second driven arms 133.

In addition, in an embodiment, one or more synchronization assemblies and damping assemblies may be disposed.

For example, the number of synchronization assemblies disposed may be the same as the number of the first driven arms 123 (or the second driven arms 133), and the number of damping assemblies disposed may be the same as or different from the number of synchronization assemblies disposed.

In actual disclosure, the hinge 10 may be used in a variety of mobile terminals that require folding through the hinge 10.

Figure 19:
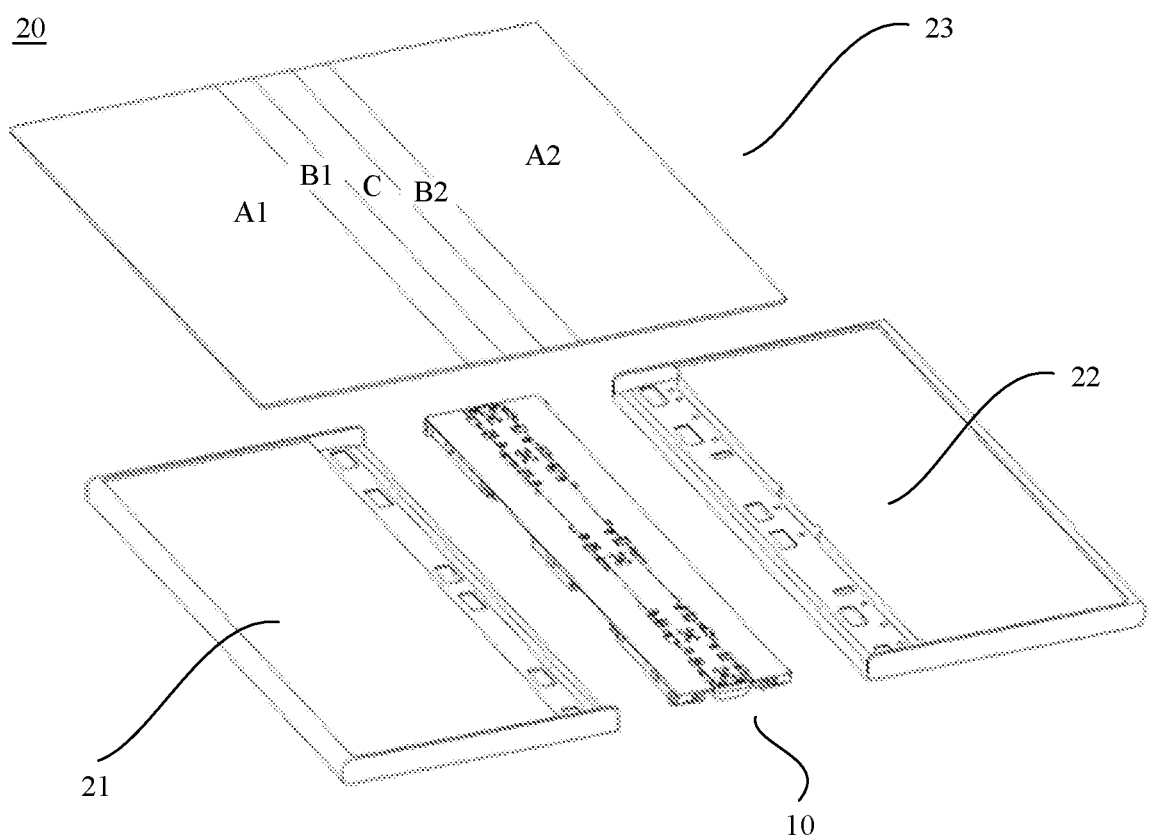
FIG. 19 is a schematic diagram of structure decomposition of a mobile terminal according to an embodiment of this disclosure.

For example, as shown in FIG. 19, a mobile terminal 20 according to an embodiment of this disclosure includes a first housing 21, a second housing 22, a flexible display 23, and any one of the foregoing hinges 10; and the first housing 21 and the second housing 22 are rotatably connected using a hinge 10.

In an embodiment, the first housing 21 may be fixedly connected to the first swing link 121, and the second housing 22 may be fixedly connected to the second swing link 131. For example, the first housing 21 may be fixedly connected to the first swing link 121 by using screws or through welding, bonding, or the like, and the second housing 22 may be fixedly connected to the second swing link 131 by using screws or through welding, bonding, or the like. In actual disclosure, devices such as a processor, a battery, and a camera may be disposed in the first housing 21 and the second housing 22.

In addition, in an embodiment, the mobile terminal may include a flexible display 23 (for example, an OLED display), where a part of the flexible display 23 may be fixedly connected to the first housing 21, and another part may be fixedly connected to the second housing 22.

Figure 20:
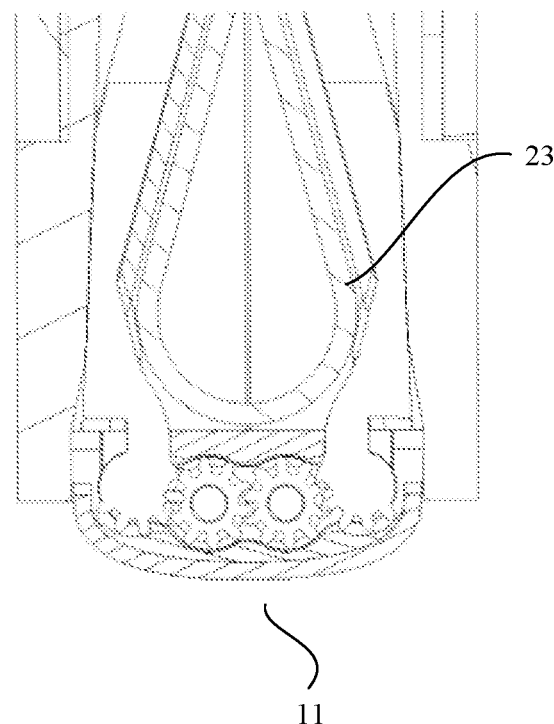
FIG. 20 is a local schematic cross-sectional structural diagram of a mobile terminal according to an embodiment of this disclosure.

In an embodiment, a part of the flexible display 23 (for example, a region A1) may be adhered to the first housing 21, and a part of the flexible display 23 (for example, a region A2) may be adhered to the second housing 22. During folding and unfolding of the hinge 10, the length of the hinge 10 can be extended or reduced as the folding angle changes, the first swing link 121 is fixedly connected to the first housing 21, and the second swing link 131 is fixedly connected to the second housing 22. Therefore, during folding and unfolding of the mobile terminal 20, the length of the connection between the first housing 21, the hinge 10, and the second housing 22 is extended or reduced, so that neither pressing force nor stretching force is imposed on the flexible display 23. For example, when the mobile terminal 20 is gradually unfolded, the length of the hinge 10 is gradually reduced. When the mobile terminal 20 is fully unfolded (an included angle between the first housing 21 and the second housing 22 is 180°), the length of the hinge 10 is the same as the length of the flexible display 23 including regions B1, C, and B2. In addition, the first support plate 124, the inner housing 111, and the second support plate 134 form a flat support surface, so that a good supporting function can be provided for the flexible display 23 (regions B1, C, and B2). Referring to FIG. 20, when the mobile terminal 20 is gradually folded, the length of the hinge 10 is gradually extended, thereby ensuring that no compressive force is imposed on the flexible display 23 (regions B1, C, and B2). In addition, the first support plate 124, the inner housing 111, and the second support plate 134 gradually enclose to form an accommodation space for accommodating the regions B1, C, and B2 (the cross-section of the accommodation space may be similar to a water drop shape), so as to prevent the flexible display 23 from being bent at a large angle, thereby avoiding occurrence of undesirable phenomena such as creases.

In an embodiment, the flexible display 23 may also be fixedly attached to the first support plate 124 and the second support plate 134. In an embodiment, a part of the flexible display 23 (for example, the region B1) may be adhered to the first support plate 124, and a part of the flexible display 23 (for example, the region B2) may be adhered to the second support plate 134. Because the first swing link 121 can generate a sliding action relative to the main body 11 (the first driven arm 123) during folding and unfolding of the hinge 10, the second swing link 131 can generate a sliding action relative to the main body 11 (the second driven arm 133), the first support plate 124 is rotatably disposed on the first swing link 121, and the second support plate 134 is rotatably disposed on the second swing link 131, the first swing link 121 can generate a sliding and a rotation action relative to the main body 11, and the second swing link 131 can generate a sliding and a rotation action relative to the main body 11. Therefore, in the folding process and unfolding process, the movement tracks of the first support plate 124 and the second support plate 134 naturally follow the folding and unfolding tracks of the flexible display 23, so as to avoid undesirable effects such as stretching and compression of the flexible display. In addition, the shape of the bending region (region C) of the flexible display can be effectively controlled, thereby improving use effect and stability of the mobile terminal 20.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:
1. A hinge, comprising:
   a main body;
   a first folding assembly comprising a first rotating assembly, a first swing link, and a first support plate, wherein the first rotating assembly is rotatably connected to the main body, and wherein the first support plate is rotatably connected to the first swing link and slidably connected to the first rotating assembly; and
   a second folding assembly comprising a second rotating assembly, a second swing link, and a second support plate, wherein the second rotating assembly is rotatably connected to the main body, and wherein the second support plate is rotatably connected to the second swing link and slidably connected to the second rotating assembly, wherein the first and second folding assemblies are symmetrically disposed along the main body, wherein when the first swing link and the second swing link rotate toward each other, the first swing link drives the first rotating assembly to rotate around the main body, wherein the first rotating assembly extends to drive the first support plate to rotate in the same direction relative to the first swing link, wherein the second swing link drives the second rotating assembly to rotate around the main body, wherein the second rotating assembly extends to drive the second support plate to rotate in the same direction relative to the second swing link, wherein when the first support plate and the second support plate are rotated to a first position, a preset angle is formed between the first support plate and the second support plate, and wherein the first support plate, the second support plate and the main body jointly form a display accommodation space.

2. The hinge according to claim 1, wherein when the first swing link and the second swing link rotate away from each other, the first swing link drives the first rotating assembly to rotate around the main body, wherein the first rotating assembly contracts to drive the first support plate to rotate in the same direction relative to the first swing link, wherein the second swing link drives the second rotating assembly to rotate around the main body, wherein the second rotating assembly contracts to drive the second support plate to rotate in the same direction relative to the second swing link, wherein when the first support plate and the second support plate are rotated to a second position, the first support plate, the second support plate and the main body are flattened to form a support surface.

3. The hinge according to claim 1, wherein the first support plate can slide relative to the first rotating assembly in a direction perpendicular to a rotation axis of the first rotating assembly; wherein the second support plate can slide relative to the second rotating assembly in a direction perpendicular to a rotation axis of the second rotating assembly.

4. The hinge according to claim 1, wherein the first rotating assembly comprises a first swing arm and a first driven arm, wherein rotation axes of the first driven arm and the first swing arm on the main body are parallel to each other and do not coincide, wherein one end of the first swing arm is rotatably connected to the main body, wherein the other end is rotatably connected to the first swing link, wherein one end of the first driven arm is rotatably connected to the main body, and wherein the other end is slidably connected to the first swing link; and
wherein the second rotating assembly comprises a second swing arm and a second driven arm, wherein rotation axes of the second driven arm and the second swing arm on the main body are parallel to each other and do not coincide, wherein one end of the second swing arm is rotatably connected to the main body, wherein the other end is rotatably connected to the second swing link, wherein one end of the second driven arm is rotatably connected to the main body, and wherein the other end is slidably connected to the second swing link.

5. The hinge according to claim 4, wherein when the first swing link and the second swing link rotate toward each other, the first swing link and the first swing arm extend relative to the first driven arm, and wherein the second swing link and the second swing arm extend relative to the second driven arm, so as to increase a length of the hinge.

6. The hinge according to claim 4, wherein when the first swing link and the second swing link rotate away from each other, the first swing link and the first swing arm contract relative to the first driven arm, and wherein the second swing link and the second swing arm contract relative to the second driven arm reduce the length of the hinge.

7. The hinge according to claim 4, further comprising an inner housing and an outer housing, wherein
a first arc groove and a second arc groove are disposed between the inner housing and the outer housing;
wherein a first arc shaft is disposed at one end of the first swing arm, and a second arc shaft is disposed at one end of the second swing arm;
wherein the first arc shaft is slidably disposed in the first arc groove to form a rotational connection between the first swing arm and the main body; and
wherein the second arc shaft is slidably disposed in the second arc groove to form a rotational connection between the second swing arm and the main body.

8. The hinge according to claim 4, wherein a third arc groove is disposed on the first swing link, and wherein a third arc shaft is disposed on the first support plate;
wherein the third arc shaft is slidably disposed in the third arc groove to form a rotational connection between the first swing link and the first support plate;
wherein a fourth arc groove is slidably disposed on the second swing link, and wherein a fourth arc shaft is disposed on the second support plate; and
wherein the fourth arc shaft is disposed in the fourth arc groove to form a rotational connection between the second swing link and the second support plate.

9. The hinge according to claim 4, wherein a third sliding groove is disposed on the first support plate, wherein a first positioning shaft is disposed on the first swing arm or the first driven arm, and wherein the first positioning shaft is slidably disposed in the third sliding groove to form a sliding connection between the first swing arm or the first driven arm and the first support plate; and
wherein a fourth sliding groove is disposed on the second support plate, wherein a second positioning shaft is disposed on the second swing arm or the second driven arm, and wherein the second positioning shaft is slidably disposed in the fourth sliding groove to form a sliding connection between the second swing arm or the second driven arm and the second support plate.

10. The hinge according to claim 4, further comprising a synchronization assembly,
drivingly connected to the first driven arm and the second driven arm for implementing synchronous reverse rotation between the first folding assembly and the second folding assembly.

11. The hinge according to claim 10, wherein the synchronization assembly comprises a first gear and a second gear that are engaged with each other;
wherein the first gear is fastened to one end of the first driven arm, and wherein the second gear is fastened to one end of the second driven arm; and
wherein an axis of the first gear coincides with a rotation axis of the first driven arm on the main body, and wherein an axis of the second gear coincides with a rotation axis of the second driven arm on the main body.

12. The hinge according to claim 11, wherein the synchronization assembly comprises an even number of driven gears, and wherein the first gear and the second gear are drivingly connected using the even number of driven gears.

13. The hinge according to claim 12, further comprising a damping assembly, wherein one end of the damping assembly is abutted against the first driven arm and the second driven arm, and wherein the other end is abutted against the main body to provide a damping force when the first driven arm and the second driven arm are relatively rotated.

14. The hinge according to claim 13, wherein along a first direction, a first cam structure is disposed at each end of two ends of the first gear, wherein a second cam structure is disposed at each end of two ends of the second gear; wherein the first direction is a rotation axial direction of the first driven arm and the second driven arm;
  wherein the damping assembly comprises a first conjoined cam, a second conjoined cam, a first abutment spring, and a second abutment spring;
  wherein along the first direction, the first conjoined cam and the second conjoined cam are disposed on two sides of the synchronization assembly, and wherein the first conjoined cam is abutted against the first cam structure and the second cam structure disposed on the same side; wherein the second conjoined cam is abutted against the first cam structure and the second cam structure disposed on the same side;
  wherein along the first direction, the first abutment spring and the second abutment spring are disposed on a side of the first conjoined cam away from the second conjoined cam; wherein the first abutment spring and the second abutment spring are elastically abutted against the first conjoined cam, and wherein the first conjoined cam is pressed to the synchronization assembly.

15. The hinge according to claim 14, wherein along the rotational axial direction of the driven gears, a third cam structure is disposed at each end of two ends of the driven gears;
  wherein the first conjoined cam is abutted against the third cam structures disposed on the same side; wherein the second conjoined cam is abutted against the third cam structures disposed on the same side;
  wherein the damping assembly comprises third abutment springs, along the rotational axial direction of the driven gears, wherein the third abutment springs are disposed on a side of the first conjoined cam away from the second conjoined cam, and wherein the third abutment springs are elastically abutted against the first conjoined cam.

16. A mobile terminal, comprising:
  a first housing, a second housing, a flexible display, and a hinge; the hinge comprising
  a main body,
  a first folding assembly having a first rotating assembly, a first swing link, and a first support plate, wherein the first rotating assembly is rotatably connected to the main body, and wherein the first support plate is rotatably connected to the first swing link and slidably connected to the first rotating assembly;
  a second folding assembly having a second rotating assembly, a second swing link, and a second support plate, wherein the second rotating assembly is rotatably connected to the main body, and wherein the second support plate is rotatably connected to the second swing link and slidably connected to the second rotating assembly, wherein the first and second folding assemblies are symmetrically disposed along the main body;
  wherein when the first swing link and the second swing link rotate toward each other, the first swing link drives the first rotating assembly to rotate around the main body, wherein the first rotating assembly extends to drive the first support plate to rotate in the same direction relative to the first swing link, wherein the second swing link drives the second rotating assembly to rotate around the main body, wherein the second rotating assembly extends to drive the second support plate to rotate in the same direction relative to the second swing link, wherein when the first support plate and the second support plate are rotated to a first position, a preset angle is formed between the first support plate and the second support plate, and wherein the first support plate, the second support plate and the main body jointly form a display accommodation space;
  wherein the first housing is fixedly connected to the first swing link, and the second housing is fixedly connected to the second swing link;
  wherein a part of the flexible display is fixedly connected to the first housing, and wherein a part of the flexible display is fixedly connected to the second housing; and
  wherein the first housing comprises a first surface, the second housing comprises a second surface, the flexible display continuously covers the first surface of the first housing, the hinge and the second surface of the second housing, and wherein the flexible display is fixedly connected to the first surface of the first housing and the second surface of the second housing.

17. The mobile terminal according to claim 16, wherein the flexible display is fixedly connected to the first support plate and the second support plate.

18. The mobile terminal according to claim 16, wherein when the first swing link and the second swing link rotate away from each other, wherein the first swing link drives the first rotating assembly to rotate around the main body, wherein the first rotating assembly contracts to drive the first support plate to rotate in the same direction relative to the first swing link, and wherein the second swing link drives the second rotating assembly to rotate around the main body, wherein the second rotating assembly contracts to drive the second support plate to rotate in the same direction relative to the second swing link, when the first support plate and the second support plate are rotated to a second position, the first support plate, the second support plate and the main body are flattened to form a support surface.

19. The mobile terminal according to claim 16, wherein the first support plate can slide relative to the first rotating assembly in a direction perpendicular to a rotation axis of the first rotating assembly; wherein the second support plate can slide relative to the second rotating assembly in a direction perpendicular to a rotation axis of the second rotating assembly.

20. The mobile terminal according to claim 16, wherein the first rotating assembly comprises a first swing arm and a first driven arm, wherein rotation axes of the first driven arm and the first swing arm on the main body are parallel to each other and do not coincide, wherein one end of the first swing arm is rotatably connected to the main body, wherein the other end is rotatably connected to the first swing link, wherein one end of the first driven arm is rotatably connected to the main body, and wherein the other end is slidably connected to the first swing link; and
  wherein the second rotating assembly comprises a second swing arm and a second driven arm, wherein rotation axes of the second driven arm and the second swing arm on the main body are parallel to each other and do not coincide, wherein one end of the second swing arm is rotatably connected to the main body, wherein the other end is rotatably connected to the second swing link, wherein one end of the second driven arm is rotatably connected to the main body, and wherein the other end is slidably connected to the second swing link.

21. The mobile terminal according to claim 20, wherein when the first swing link and the second swing link rotate toward each other, the first swing link and the first swing arm extend relative to the first driven arm, and wherein the second swing link and the second swing arm extend relative to the second driven arm, so as to increase a length of the hinge.

22. The mobile terminal according to claim 20, wherein when the first swing link and the second swing link rotate away from each other, the first swing link and the first swing arm contract relative to the first driven arm, and wherein the second swing link and the second swing arm contract relative to the second driven arm, so as to reduce the length of the hinge.

23. The mobile terminal according to claim 20, wherein the hinge further comprises an inner housing and an outer housing, wherein
a first arc groove and a second arc groove are disposed between the inner housing and the outer housing;
wherein a first arc shaft is disposed at one end of the first swing arm, and a second arc shaft is disposed at one end of the second swing arm;
wherein the first arc shaft is slidably disposed in the first arc groove to implement a rotational connection between the first swing arm and the main body; and
wherein the second arc shaft is slidably disposed in the second arc groove to implement a rotational connection between the second swing arm and the main body.

24. The mobile terminal according to claim 20, wherein a third arc groove is disposed on the first swing link, and a third arc shaft is disposed on the first support plate;
the third arc shaft is slidably disposed in the third arc groove to implement a rotational connection between the first swing link and the first support plate;
a fourth arc groove is slidably disposed on the second swing link, and a fourth arc shaft is disposed on the second support plate;
the fourth arc shaft is disposed in the fourth arc groove to implement a rotational connection between the second swing link and the second support plate.

25. The mobile terminal according to claim 20, wherein a third sliding groove is disposed on the first support plate, wherein a first positioning shaft is disposed on the first swing arm or the first driven arm, and wherein the first positioning shaft is slidably disposed in the third sliding groove to implement a sliding connection between the first swing arm or the first driven arm and the first support plate; and
wherein a fourth sliding groove is disposed on the second support plate, wherein a second positioning shaft is disposed on the second swing arm or the second driven arm, and wherein the second positioning shaft is slidably disposed in the fourth sliding groove to implement a sliding connection between the second swing arm or the second driven arm and the second support plate.

26. The mobile terminal according to claim 20, wherein the hinge further comprises a synchronization assembly, wherein
the synchronization assembly is drivingly connected to the first driven arm and the second driven arm for implementing synchronous reverse rotation between the first folding assembly and the second folding assembly.

27. The mobile terminal according to claim 26, wherein the synchronization assembly comprises a first gear and a second gear that are engaged with each other;
wherein the first gear is fastened to one end of the first driven arm, and the second gear is fastened to one end of the second driven arm; and
wherein an axis of the first gear coincides with a rotation axis of the first driven arm on the main body, wherein an axis of the second gear coincides with a rotation axis of the second driven arm on the main body.

28. The mobile terminal according to claim 27, wherein the synchronization assembly comprises an even number of driven gears, and wherein the first gear and the second gear are drivingly connected using the even number of driven gears.

29. The mobile terminal according to claim 28, comprising a damping assembly, wherein one end of the damping assembly is abutted against the first driven arm and the second driven arm, and wherein the other end is abutted against the main body to provide a damping force when the first driven arm and the second driven arm are relatively rotated.

30. The hinge according to claim 29, wherein along a first direction, a first cam structure is disposed at each end of two ends of the first gear, wherein a second cam structure is disposed at each end of two ends of the second gear; wherein the first direction is a rotation axial direction of the first driven arm and the second driven arm;
wherein the damping assembly comprises a first conjoined cam, a second conjoined cam, a first abutment spring, and a second abutment spring;
wherein along the first direction, the first conjoined cam and the second conjoined cam are disposed on two sides of the synchronization assembly, and wherein the first conjoined cam is abutted against the first cam structure and wherein the second cam structure is disposed on the same side; wherein the second conjoined cam is abutted against the first cam structure and the second cam structure disposed on the same side;
wherein along the first direction, the first abutment spring and the second abutment spring are disposed on a side of the first conjoined cam away from the second conjoined cam;
wherein the first abutment spring and the second abutment spring are elastically abutted against the first conjoined cam, and wherein the first conjoined cam is pressed to the synchronization assembly.

* * * * *